United States Patent

Dogahara et al.

[11] Patent Number: 5,738,832
[45] Date of Patent: Apr. 14, 1998

[54] EXHAUST GAS PURIFYING APPARATUS

[75] Inventors: Takashi Dogahara; Kazuo Koga; Yoshiaki Danno; Daisuke Sanbayashi, all of Tokyo; Kozo Iida, Hiroshima; Satoru Serizawa, Nagasaki; Norihisa Kobayashi, Tokyo, all of Japan

[73] Assignees: Mitsubishi Jidosha Kogyo Kabushiki Kaisha; Mitsubishi Jukogyo Kabushiki Kaisha, both of Tokyo, Japan

[21] Appl. No.: 621,704

[22] Filed: Mar. 26, 1996

Related U.S. Application Data

[63] Continuation of Ser. No. 318,773, filed as PCT/LP94/00225, filed on Feb. 15, 1994, abandoned.

[30] Foreign Application Priority Data

| Feb. 15, 1993 | [JP] | Japan | 5-025351 |
| Feb. 15, 1993 | [JP] | Japan | 5-025352 |
| Feb. 15, 1993 | [JP] | Japan | 5-025353 |
| Feb. 15, 1993 | [JP] | Japan | 5-025354 |
| Feb. 15, 1993 | [JP] | Japan | 5-025355 |
| Feb. 15, 1993 | [JP] | Japan | 5-025356 |
| Feb. 15, 1993 | [JP] | Japan | 5-025357 |

[51] Int. Cl.$^6$ .................. F01N 3/20; B01D 50/00
[52] U.S. Cl. .................. 422/171; 422/173; 60/297
[58] Field of Search .................. 422/168, 169, 422/171, 170, 173, 174, 177, 180; 60/274, 279, 288, 299, 297, 302

[56] References Cited

U.S. PATENT DOCUMENTS

| 3,791,143 | 2/1974 | Keith et al. | 60/274 |
| 4,023,360 | 5/1977 | Wossner et al. | 60/277 |
| 4,817,385 | 4/1989 | Kumagai | 60/288 |
| 4,985,210 | 1/1991 | Minami | 422/169 |
| 5,067,319 | 11/1991 | Moser | 60/288 |
| 5,125,231 | 6/1992 | Patil et al. | 422/161 |
| 5,158,753 | 10/1992 | Take et al. | 422/173 |
| 5,264,186 | 11/1993 | Harada et al. | 422/171 |
| 5,271,906 | 12/1993 | Yuuki et al. | 422/177 |
| 5,315,824 | 5/1994 | Takeshima | 60/297 |
| 5,388,405 | 2/1995 | Fujushita et al. | 60/297 |
| 5,398,503 | 3/1995 | Danno et al. | 60/288 |

FOREIGN PATENT DOCUMENTS

| 1257710 | 10/1989 | Japan . |
| 0424966 | 5/1991 | Japan . |
| 165816 | 7/1991 | Japan . |
| 194113 | 8/1991 | Japan . |
| 229638 | 10/1991 | Japan . |
| 18236 | 1/1993 | Japan . |
| 544446 | 2/1993 | Japan . |
| 149131 | 6/1993 | Japan . |
| 5149131 | 6/1993 | Japan . |
| 33752 | 2/1994 | Japan . |
| 633752 | 2/1994 | Japan . |

*Primary Examiner*—Nina Bhat

[57] ABSTRACT

An exhaust gas purifying apparatus, which is intended to improve hydrocarbon purifying performance and simplify the after-treatment of adsorbed hydrocarbon, an in which a three way valve 51 is operated under the control of a controller 80 to cause a bypass exhaust gas passage 30 to be communicated with a main exhaust gas passage, so that hydrocarbon in exhaust gas is adsorbed onto an adsorption catalyst 40 when the temperature of a three way catalyst 20 in the main exhaust gas passage 13 is low. When the three way catalyst temperature increases, the bypass exhaust gas passage is shut off from the main exhaust gas passage by the three way valve and the adsorption catalyst is heated by a heater 60, so that the adsorbed hydrocarbon is oxidized at the adsorption catalyst to form a harmless substance.

14 Claims, 27 Drawing Sheets

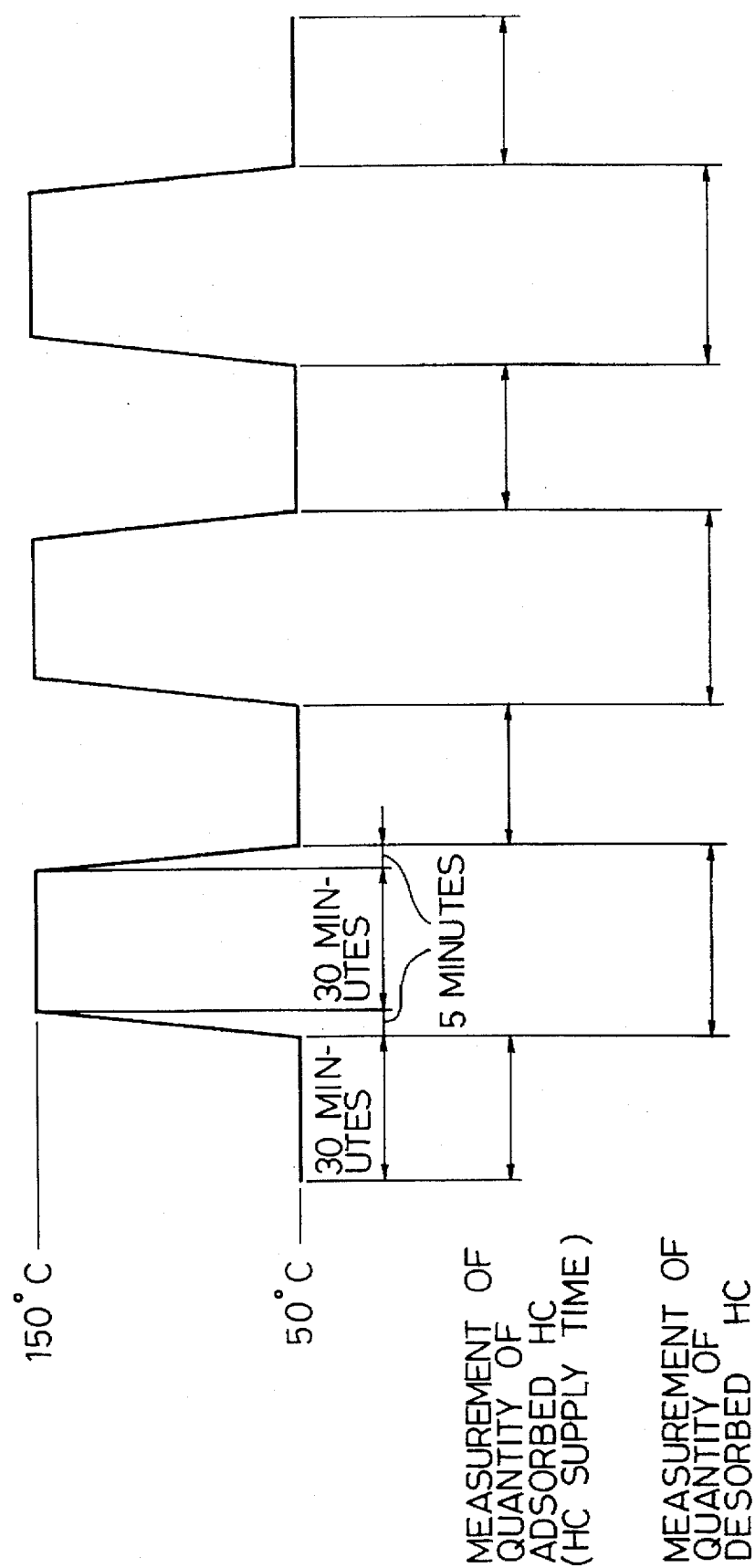

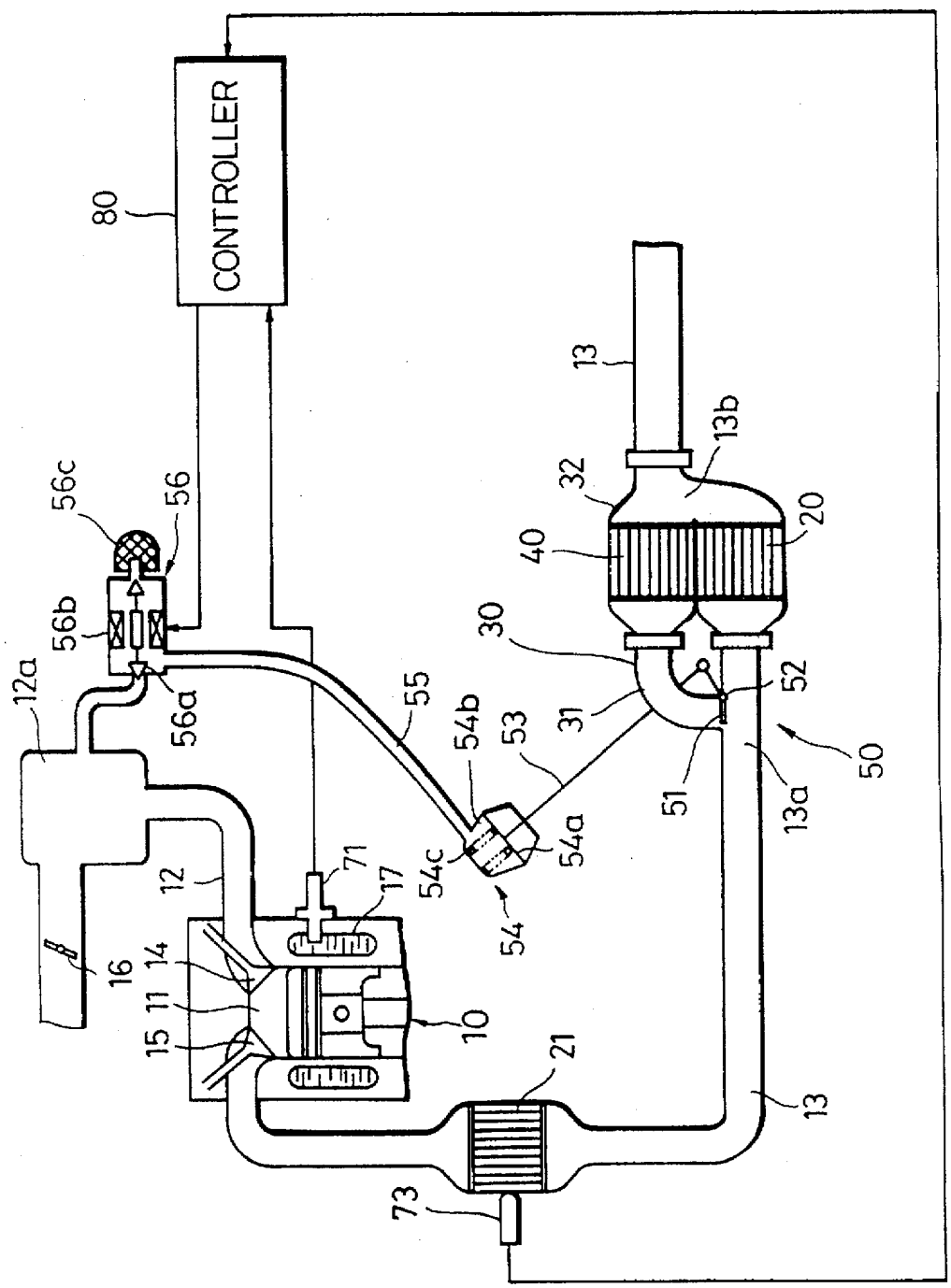

EXHAUST GAS PURIFYING APPARATUS

This application is a continuation, of application Ser. No. 08/318,773, filed as PCT/LP94/00225 filed on Feb. 15, 1994, now abandoned.

TECHNICAL FIELD

The present invention relates to an exhaust gas purifying apparatus in which hydrocarbon contained in exhaust gas is adsorbed onto an adsorbent (adsorption catalyst).

BACKGROUND ART

The exhaust gas purifying apparatus for removing harmful matters contained in exhaust gas, which is emitted from the engine of motor vehicle etc., uses a catalyst such as a three way catalyst for simultaneously decreasing hydrocarbon (HC), carbon monoxide (CO), and nitrogen oxides (NOx). However, before the catalyst reaches the activation temperature, the exhaust gas purifying function of the catalyst is not fully performed; therefore, harmful HC is emitted to the atmosphere, for example, at the cold start of engine.

To solve this problem, a construction has been proposed in which HC contained in exhaust gas at the cold start of engine is adsorbed onto an adsorbent installed on the downstream side of the catalyst, and then HC desorbed from the adsorbent is forcedly refluxed to the catalyst or the like.

For example, U.S. Pat. No. 5,142,864 discloses a method for exhaust gas treatment which uses a catalyst, adsorbent, and turbo-charger. With this method, in order to suppress HC emission from exhaust gas at the cold start of engine, when the engine is cold, the exhaust gas is made to flow to an adsorbent via the catalyst and the turbine side of the turbo-charger so that HC in the exhaust gas is adsorbed onto the adsorbent. Afterwards, when the adsorbent temperature increases, the exhaust gas is discharged to the atmosphere by bypassing the adsorbent; meanwhile, the HC desorbed from the adsorbent using part of exhaust gas is made to join with the exhaust gas from the engine on the upstream side of the catalyst via the compressor side of the turbo-charger, so that HC is purified by the catalyst.

Also, a paper titled "Cold-Start Hydrocarbon Collection for Advanced Exhaust Emission Control" (SAE PAPER 920847) published by Heimrich et al. in February, 1992, describes an apparatus in which HC is collected by an adsorbent installed in the exhaust system at the cold start of engine, and then the HC desorbed from the adsorbent is forcedly refluxed to the upstream side of an oxidation catalyst installed on the downstream side of a three way catalyst in a catalytic converter in order to purify HC. This paper also describes another apparatus in which the HC desorbed from the adsorbent is forcedly refluxed to the suction side of the engine so that it is burnt in the engine combustion chamber.

However, in the conventional exhaust gas purifying apparatuses in which the HC desorbed from the adsorbent is purified by the catalyst, it is not always easy to simply and suitably control both the adsorbent temperature and the catalyst temperature, and the adsorbent sometimes reaches the HC desorption temperature before the catalyst reaches the activation temperature. In this case, HC is desorbed from the adsorbent before the activation of catalyst is completed; therefore, HC is discharged to the outside of the apparatus without being purified by the catalyst even if the desorbed HC is refluxed to the catalyst. That is to say, the conventional apparatus sometimes cannot perform the required HC purification.

Further, in the above-described conventional apparatuses, it is necessary to install HC refluxing means, including, for example, a turbo-charger or an air pump and related pipes, to reflux the HC desorbed from the adsorbent to the catalyst or to the suction side of engine. Therefore, the construction of the apparatus for the after-treatment of adsorbed HC becomes complex, so that the cost of apparatus increases.

DISCLOSURE OF THE INVENTION

An object of the present invention is to provide an exhaust gas purifying apparatus of a type such that hydrocarbon contained in exhaust gas at the cold start of engine is adsorbed onto an adsorption catalyst, which has excellent hydrocarbon purifying performance and simple construction of apparatus for the after-treatment of hydrocarbon adsorbed onto the adsorption catalyst.

To achieve the above object, an exhaust gas purifying apparatus according to one aspect of the present invention comprises a main catalyst interposed in a main exhaust gas passage for purifying exhaust gas from an engine, the main exhaust gas passage being communicated with an exhaust side of the engine; an adsorbent interposed in a bypass exhaust gas passage for adsorbing hydrocarbon contained in the exhaust gas, the bypass exhaust gas passage being communicated at least at its upstream end with the main exhaust gas passage, the adsorbent having a catalytic function of oxidizing adsorbed hydrocarbon in a predetermined temperature range; heating means for heating the adsorbent; and exhaust route selecting means for selectively inhibiting communication between the bypass exhaust gas passage and the main exhaust gas passage, the communication being established at least at one end of the bypass exhaust gas passage.

Preferably, the adsorbent is formed of crystalline silicate which carries copper. The exhaust gas purifying apparatus further includes temperature detecting means for producing an output representative of a main catalyst temperature or an exhaust gas temperature near the main catalyst, and control means for operating the heating means, and for operating the exhaust route selecting means in accordance with the output of the temperature detecting means. The heating means is, for example, an electric heater.

According to another aspect of the present invention, an exhaust gas purifying apparatus comprises the aforementioned main catalyst, adsorbent, adsorbent heating means, and exhaust route selecting means, and further comprises temperature detecting means for detecting a parameter value relating to an engine temperature, and control means for operating the exhaust route selecting means in accordance with the parameter value detected by the temperature detecting means.

Preferably, the temperature detecting means detects an engine cooling water temperature. When the detected engine cooling water temperature is lower than a predetermined value, the control means operates the exhaust route selecting means such that the operation of inhibiting the communication between the bypass exhaust gas passage and the main exhaust gas passage is not carried out by the exhaust route selecting means. When the detected engine cooling water temperature is not lower than the predetermined value, the control means operates the exhaust route selecting means such that the communication inhibiting operation is carried out by the exhaust route selecting means. Alternatively, before a predetermined time, determined in accordance with a value of the detected engine cooling water temperature at the engine start, has elapsed from the engine start, the control means operates the exhaust route selecting means such that the operation of inhibiting the communication between the bypass exhaust gas passage and the main exhaust gas passage is not carried out by the exhaust route selecting means. After the predetermined time has elapsed, the control means operates the exhaust gas passage means such that the communication inhibiting operation is carried out by the exhaust route selecting means. Also, the control means causes the heating means to start its operation after or before the exhaust gas passage selecting means carries out the communication inhibiting operation.

The exhaust gas purifying apparatus is provided with adsorbent temperature detecting means. Before the detected adsorbent temperature reaches an adsorbent deteriorating temperature range, the control means operates the exhaust route selecting means such that the operation of inhibiting the communication between the exhaust gas passages is carried out by the exhaust route selecting means. Before the detected adsorbent temperature reaches the adsorbent deteriorating temperature range, the control means stops the heating of the adsorbent performed by the heating means.

According to still another aspect of the present invention, an exhaust gas purifying apparatus comprises the aforementioned main catalyst, adsorbent, adsorbent heating means, and exhaust route selecting means, and further comprises temperature detecting means for detecting an adsorbent temperature, and control means for operating the exhaust route selecting means in accordance with an output of the temperature detecting means representative of the detected adsorbent temperature.

Preferably, when the detected adsorbent temperature reaches a predetermined value on a lower temperature side with respect to a predetermined temperature range, the control means operates the exhaust route selecting means such that the operation of inhibiting the communication between the exhaust gas passages is carried out by the exhaust route selecting means.

According to still another aspect of the present invention, an exhaust gas purifying apparatus comprises the aforementioned main catalyst, adsorbent, and exhaust route selecting means, wherein the main catalyst and the adsorbent are arranged so that heat transfer is allowed from the main catalyst to the adsorbent.

Preferably, the adsorbent is arranged so that at least one end thereof is exposed to the main exhaust gas passage. The exhaust route selecting means includes a closing member which selectively takes a first operating position where a limited flow of exhaust gas to the bypass exhaust gas passage is allowed and a flow of exhaust gas to the main exhaust gas passage is allowed or a second operating position where a flow of exhaust gas to the bypass exhaust gas passage is allowed and the flow of exhaust gas to the main exhaust gas passage is prevented, and a drive section for moving the closing member between the first and second operating positions.

Preferably, the exhaust gas purifying apparatus includes temperature detecting means for detecting a main catalyst temperature or an exhaust gas temperature near the main catalyst or a parameter value relating to the engine temperature, and control means for operating the exhaust route selecting means in accordance with an output of the temperature detecting means. Alternatively, the control means operates the exhaust route selecting means in accordance with the elapsed time from the engine start.

Preferably, a front catalyst for purifying exhaust gas is arranged in the main exhaust gas passage on an upstream side of the main catalyst and the adsorbent. More preferably, the exhaust gas purifying apparatus includes temperature detecting means for detecting a front catalyst temperature or an exhaust gas temperature near the front catalyst, and control means for operating the exhaust route selecting means in accordance with an output of the temperature detecting means.

More specifically, for the adsorption catalyst, catalysts described in Japanese Provisional Patent Publications Nos. 3-229638, 3-165816, 3-229620, 4-4045, 3-127628 and the like can be used.

A catalyst of this kind is formed of crystalline silicate which carries copper. The crystalline silicate has a chemical formula of $(1\pm0.6)R_2O.[aM_2O_3.bAl_2O_3].ySiO_2$ (where, R is alkali metal ion and/or hydrogen ion, M is one or more kinds of metal selected from a group consisting of VIII group metal, rare earth metal, titanium, vanadium, chromium, niobium, antimony, and gallium, $a\geq0$, $b\geq0$, $a+b=1$, $y>12$), and has an X-ray diffraction pattern given in Table 1. This catalyst is used as an adsorption catalyst for hydrocarbon by wash-coating it on a cordierite honeycomb.

TABLE 1

| 2θ | I/Io |
|---|---|
| 7.9 ± 0.1 | VS |
| 8.8 ± 0.1 | VS |
| 13.2 ± 0.2 | W |
| 13.9 ± 0.2 | M |
| 14.7 ± 0.2 | M |
| 15.4 ± 0.2 | W |
| 15.9 ± 0.2 | M |
| 19.3 ± 0.2 | W |
| 20.8 ± 0.2 | M |
| 23.1 ± 0.2 | S |
| 23.8 ± 0.1 | M |
| 24.4 ± 0.2 | M |
| 26.9 ± 0.3 | M |
| 29.2 ± 0.2 | W |
| 29.9 ± 0.3 | M |

[Irradiation and Kα rays of copper]
[$I_o$ is the strongest peak intensity, and $I/I_o$ is relative intensity]
W: Weak
M: Medium
S: Strong
VS: Very strong As described above, the exhaust gas purifying apparatus according to one aspect of the present invention comprises the main catalyst interposed in the main exhaust gas passage for purifying the exhaust gas from the engine; the adsorbent interposed in a bypass exhaust gas passage, communicated at least at its upstream end with the main exhaust gas passage, for adsorbing hydrocarbon and for oxidizing the adsorbed hydrocarbon in a predetermined temperature range; the heating means for heating the adsorbent; and the exhaust route selecting means for selectively inhibiting the communication, established at least at one end of the bypass exhaust gas passage, between the bypass exhaust gas passage and the main exhaust gas passage. Therefore, the exhaust gas purifying apparatus has high hydrocarbon purifying performance, and simplifies the construction of apparatus for the after-treatment of hydrocarbon adsorbed onto the adsorbent, so that the apparatus cost can be decreased.

According to the preferred embodiment in which the exhaust route selecting means is operated by the control means responsive to the output of the temperature detecting means representative of the main catalyst temperature or the exhaust gas temperature near the main catalyst, and the heating means is operated under the control of the control means, both of the means can be operated at a suitable timing, and hydrocarbon can be purified more suitably.

The exhaust gas purifying apparatus of another aspect of the present invention, which comprises the temperature detecting means for detecting a parameter value relating to the engine temperature, and the control means for operating the exhaust route selecting means in accordance with the parameter value detected by the temperature detecting means, in addition to the main catalyst, adsorbent, adsorbent heating means, and exhaust route selecting means, has high hydrocarbon purifying performance at the engine start, and simplifies the construction of apparatus for the after-treatment of hydrocarbon adsorbed onto the adsorbent, so that the apparatus cost can be decreased.

According to the preferred embodiment in which when the detected engine cooling water temperature is lower than a predetermined value, or before a predetermined time determined in accordance with the value of the detected engine cooling water temperature at the engine start has elapsed from the engine start, the exhaust route selecting means is operated such that the operation of inhibiting the communication between the bypass exhaust gas passage and the main exhaust gas passage is not carried out by the exhaust route selecting means, and when the detected engine cooling water temperature is not lower than the predetermined value, or after the predetermined time has elapsed, the exhaust route selecting means is operated such that the communication inhibiting operation is carried out by the exhaust route selecting means, the desorption of the adsorbed hydrocarbon from the adsorbent due to the rise of the adsorbent temperature caused by the changeover of the exhaust route and in turn by the inflow of high-temperature new exhaust gas can be prevented at a suitable timing, so that hydrocarbon can be purified more suitably.

According to the preferred embodiment in which before the detected adsorbent temperature reaches the adsorbent deteriorating temperature range, the exhaust route selecting means is operated under the control of the control means such that the communication between the exhaust gas passages is inhibited, or the heating of the adsorbent performed by the heating means is stopped, the deterioration of the adsorbent can surely be prevented.

The exhaust gas purifying apparatus of still another aspect of the present invention, which comprises the temperature detecting means for detecting an adsorbent temperature, and the control means for operating the exhaust route selecting means in accordance with the output of the temperature detecting means representative of the detected adsorbent temperature, in addition to the main catalyst, adsorbent, adsorbent heating means, and exhaust route selecting means, has high hydrocarbon purifying performance at the engine start, and simplifies the construction of apparatus for the after-treatment of hydrocarbon adsorbed onto the adsorbent, so that the apparatus cost can be decreased.

The exhaust gas purifying apparatus of still another aspect of the present invention, which comprises the main catalyst, adsorbent, and exhaust route selecting means, and in which the main catalyst and the adsorbent are arranged so that heat transfer is allowed from the main catalyst to the adsorbent, has high hydrocarbon purifying performance at the engine start, and simplifies the construction of apparatus for the after-treatment of hydrocarbon adsorbed onto the adsorbent, so that the apparatus cost can be decreased. Moreover, a special heating device is not required because the adsorbent is heated by heat transfer from the main catalyst to the adsorbent.

According to the preferred embodiment in which the adsorbent is arranged so that at least one end thereof is exposed to the main exhaust gas passage, a special heating device is not required because the exposed end of the adsorbent is heated by the exhaust gas. Also, according to the preferred embodiment in which a limited flow of exhaust gas to the bypass exhaust gas passage is allowed even when the exhaust route selecting means is operated such that a flow of exhaust gas to the main exhaust gas passage is allowed, a special heating device is not required because the adsorbent is heated by using part of the exhaust gas.

According to the preferred embodiment in which the front catalyst for purifying exhaust gas is arranged in the main exhaust gas passage on the upstream side of the main catalyst and the adsorbent, the front catalyst temperature and in turn the exhaust gas temperature and the main catalyst temperature can be increased rapidly by using a small front catalyst, so that the front catalyst and the main catalyst can be activated rapidly, thereby increasing the exhaust gas purifying capacity.

Further, according to the preferred embodiment in which the exhaust route selecting means is operated under the control of the control means in accordance with the front catalyst temperature or the exhaust gas temperature near the front catalyst or in accordance with the elapsed time from the engine start, the exhaust route can be changed over at a suitable timing, so that hydrocarbon can be purified more suitably.

BRIEF DESCRIPTION OF THE DRAWINGS

FIG. 3 is a graph showing a temperature change pattern of catalyst in the adsorption and desorption tests of hydrocarbon using the test device shown in FIG. 2;

FIG. 20 is a schematic view showing an exhaust gas purifying apparatus according to a fourth embodiment of the present invention, together with peripheral elements thereof;

BEST MODE FOR CARRYING OUT THE INVENTION

Figure 1:
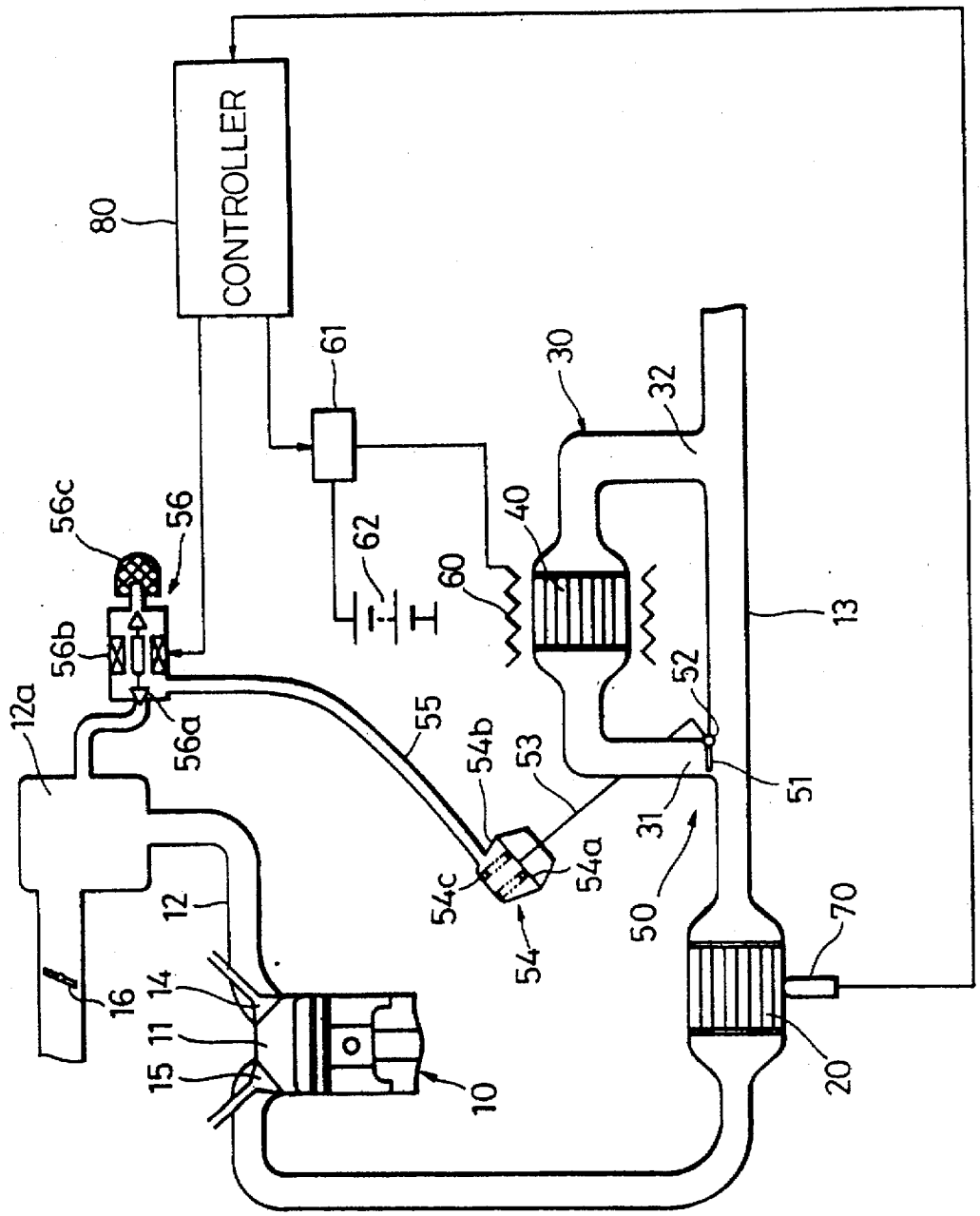
FIG. 1 is a schematic view showing an exhaust gas purifying apparatus in accordance with a first embodiment of the present invention, together with peripheral elements thereof.

Referring to FIG. 1, an exhaust gas purifying apparatus according to a first embodiment of the present invention will be described hereinbelow.

A suction air passage 12 and a main exhaust gas passage 13 are connected to combustion chambers (one of which is indicated by reference numeral 11 in FIG. 1) of respective cylinders of an engine 10 which is mounted on a vehicle together with an exhaust gas purifying apparatus. Communication between each combustion chamber 11 and the suction air passage 12 or the main exhaust gas passage 13 is established/interrupted by the opening/closing operation of a suction valve 14 or an exhaust valve 15 associated therewith. The suction air passage 12 is provided with, for example, an air cleaner (not shown), a throttle valve 16, and a fuel injection valve (not shown) which are disposed in the order named from the upstream side. The main exhaust gas passage 13 is provided with a catalytic converter 20 for purifying exhaust gas, and a muffler (not shown). The catalytic converter, serving as a main catalyst, preferably consists of a three way catalyst. Reference numeral 12a denotes a surge tank provided in the suction air passage on the downstream side of the throttle valve 16.

Further, a bypass exhaust gas passage 30 is provided which branches from the main exhaust gas passage 13 on the downstream side of the three way catalyst 20. The upstream end 31 and the downstream end 32 of the bypass exhaust gas passage are connected to a first and second intermediate portions of the main exhaust gas passage 13, respectively. The second intermediate portion is located on the downstream side of the first intermediate portion. In the bypass exhaust gas passage 30, an adsorption catalyst 40 is interposed to adsorb hydrocarbon (HC) and oxidize the adsorbed HC in a predetermined temperature range.

The adsorption catalyst 40, obtained by forming a material, which contains 1 part by weight of copper and 100 parts by weight of zeolite, crystalline silicate, or similar absorbent or porous crystalline, each containing silicon, aluminum, oxygen, etc., as its constituents, into a predetermined shape and size, is configured so as to achieve an adsorbing function of adsorbing HC and to achieve a self-oxidation function of oxidizing the adsorbed HC with oxygen lying around the adsorbed HC.

The hydrocarbon adsorbing and desorbing test method performed by using this adsorption catalyst 40 and the test results will be described below.

The tests were conducted under the following conditions:

| <Quantity of catalyst> | 1 1 | |
|---|---|---|
| <Gas composition> | C$_2$H$_4$ | 2,000 ppm |
| | C$_3$H$_6$ | 2,000 ppm (THC 10,000 ppm) |
| | O$_2$ | 5% |
| | CO$_2$ | 10% |
| | H$_2$O | 10% |
| | NO | 10% |
| | N$_2$ | balance |
| <Adsorption temperature> | 50° C. | |
| <Desorption temperature> | 150° C. | |
| <GHSV> | 30,000/h | |

Figure 2:
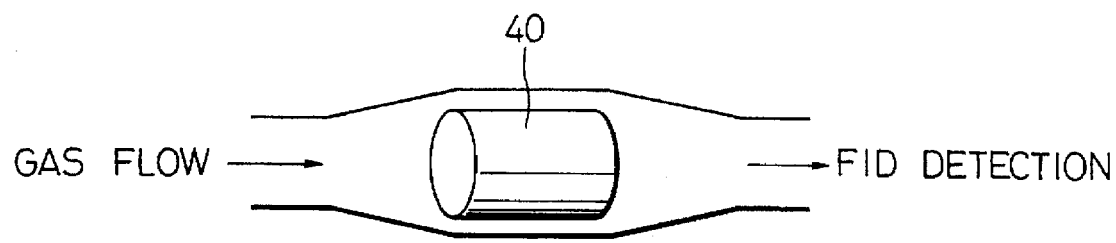
FIG. 2 is a schematic view of a test device used for the adsorption and desorption tests of hydrocarbon in relation to an adsorption catalyst shown in FIG. 1.

A test device shown in FIG. 2 was used for the tests. Quantities of adsorbed and desorbed hydrocarbon were measured by using a hydrocarbon meter having an FID. A gas of the above composition was supplied for a predetermined time (30 minutes) with the adsorption temperature kept at 50° C. To monitor the quantity of desorbed hydrocarbon, the temperature (temperature increasing rate: 20° C./min) during which hydrocarbon was shut off, but other gases were supplied, and then the temperature was kept for a predetermined time (30 minutes). FIG. 3 shows the temperature change pattern of the catalyst. Table 2 gives the result of quantity measurement of adsorbed and desorbed hydrocarbon obtained when equilibrium is established, while the adsorption temperature and the desorption temperature are alternately repeatedly reached under the above-described gas condition.

TABLE 2

| | Result of quantity measurement of adsorbed and desorbed hydrocarbon | |
|---|---|---|
| | Quantity of adsorbed hydrocarbon (50° C.) g/l | Quantity of desorbed hydrocarbon (150° C.) g/l |
| Adsorption catalyst 40 | 35 | 2 |

The result shown in Table 2 indicates that hydrocarbon of 35 g/l (catalyst). is adsorbed at 50° C. by the adsorption catalyst 40. Moreover, it has been revealed that when the adsorption catalyst onto which hydrocarbon has been adsorbed is heated to 150° C. and kept at that temperature, most of the adsorbed hydrocarbon is removed by burning, so that hydrocarbon is not desorbed as it is. The adsorbing and burning behavior is stable even if this process is repeated.

Referring again to FIG. 1, at the connecting portion between the upstream end 31 of the bypass exhaust gas passage 30 and the first intermediate portion of the main exhaust gas passage 13, a three way valve 51 is disposed to selectively allow or prevent the communication between the exhaust gas passages 13 and 30. The three way valve 51 consists, for example, of a plate-shaped member having substantially the same shape and size as those of the cross section of the exhaust gas passages 13 and 30 which have the same shape and size of the cross section at their connecting portion, to thereby make it possible to shut off the exhaust gas flow passing through the exhaust gas passage 13 or 30. The three way valve 51 is connected to a rotating shaft 52 for rotation in unison therewith, the shaft 52 being rotatably supported by the exhaust gas passage wall at the connecting portion of the exhaust gas passages 13 and 30. Further, the three way valve 50 is coupled to a diaphragm 54a of a negative pressure responsive valve 54 via the rotating shaft 52 and a link mechanism 53.

The negative pressure responsive valve 54 has a pressure chamber 54b communicating with the surge tank 12a (suction air passage 12) via a pipe 55. In this pressure chamber 54b, a spring 54c is disposed to always urge the diaphragm 54a toward the outside. At the halfway portion of the pipe 55, a selector valve 56 is disposed to selectively allow or prevent the communication between the suction air passage 12 and the pressure chamber 54b via the pipe 55. The selector valve 56 consists, for example, of a normally closed type electromagnetic solenoid valve which includes a valve element 56a for opening/closing the pipe 55 and a solenoid 56b for driving the valve element 56a in the valve opening direction. Reference numeral 56c denotes a filter for admitting the atmospheric air.

Figure 4:
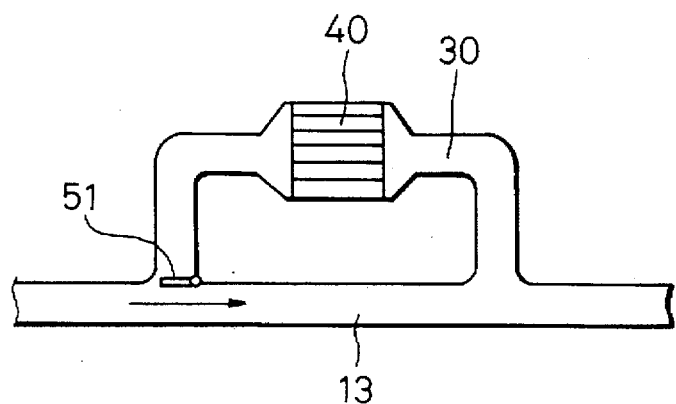
FIG. 4 is a fragmentary view showing a state in which the communication between a bypass exhaust gas passage and a main exhaust gas passage is inhibited by a three way valve shown in FIG. 1.
Figure 5:
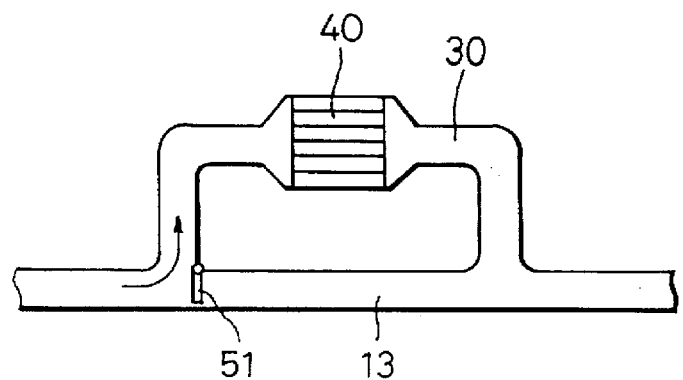
FIG. 5 is a fragmentary view showing a state in which the three way valve is at an operating position at which the communication between the bypass exhaust gas passage and the main exhaust gas passage is established.

The aforementioned elements 51 to 56 compose exhaust route selecting means 50 for selectively interrupting the communication between the bypass exhaust gas passage 30 and the main exhaust gas passage 13 at the upstream end 31 of the bypass exhaust gas passage 30, and the elements 52 to 56 compose a drive section for the three way valve. Specifically, in the normal operating condition in which the pipe 55 is closed by the valve element 56a of the electromagnetic solenoid valve 56 so that the supply of negative pressure to the negative pressure responsive valve 54 is shut off, whereas the atmospheric air is admitted to the negative pressure responsive valve 54 via the filter 56c, and hence the diaphragm 54a of the negative pressure responsive valve is urged toward the outside by the spring 54c, the three way valve 51 takes a first operating position (FIGS. 1 and 4) where the communication between the upstream end 31 of the bypass exhaust gas passage 30 and the main exhaust gas passage 13 is prevented, so that the flow of exhaust gas into the bypass exhaust gas passage 30 is inhibited. On the other hand, when the solenoid valve 56 is opened, the pressure chamber 54b of the negative pressure responsive valve 54 is communicated to the suction air passage 12, so that a negative pressure is admitted into the pressure chamber. Therefore, the diaphragm 54a is moved back toward the inside against the spring force of the spring 54c. As a result, the three way valve 51 takes a second operating position (FIG. 5) where the communication between the bypass exhaust gas passage 30 and the main exhaust gas passage 13 is allowed, so that exhaust gas flows into the bypass exhaust gas passage 30.

At the position where the adsorption catalyst 40 is arranged, a heater 60 for heating the adsorption catalyst 40 is disposed around the bypass exhaust gas passage 30. The heater 60 is connected to a battery 62 via a heater switch 61. The heater switch 61 consists, for example, of normally open type switch contacts (not shown) and an electromagnetic relay (not shown) for closing the contacts. A temperature sensor 70 for detecting the three way catalyst temperature and generating an output representing the three way catalyst temperature is disposed, for example, in such a manner that the temperature detecting portion of the temperature sensor 70 abuts on or is inserted into the three way catalyst 20.

In FIG. 1, reference numeral 80 denotes a controller which includes a microprocessor, memory, input/output circuit, etc., which are not shown. To the controller 80 are connected the temperature sensor 70, the electromagnetic solenoid valve 56, and the heater switch 61. The controller 80, together with the three way catalyst 20, the adsorption catalyst 40, the exhaust route selecting means 50, the heater 60, the temperature sensor 70. etc., composes the exhaust gas purifying apparatus.

The operation of the exhaust gas purifying apparatus shown in FIG. 1 will be described below.

Figure 6:
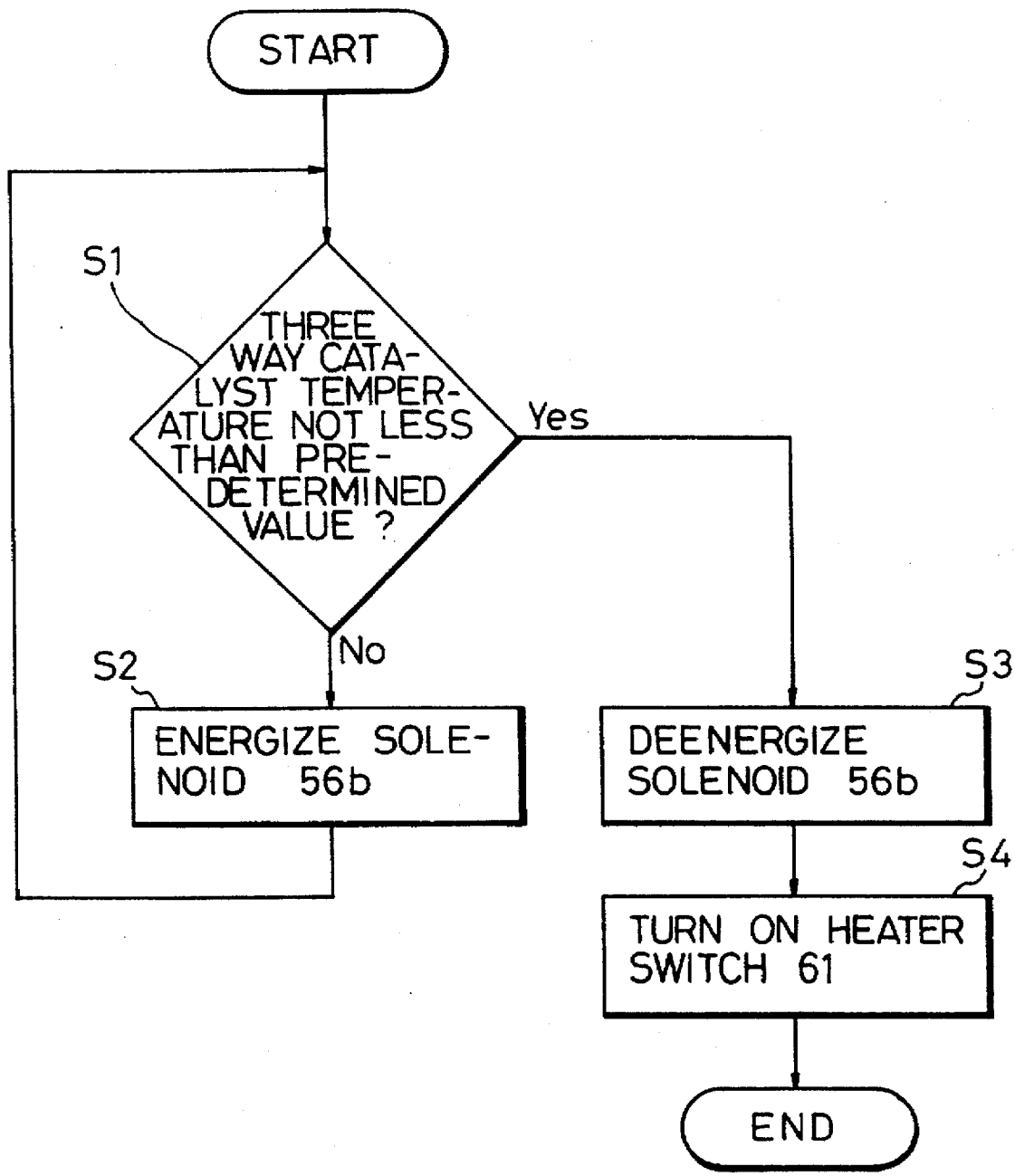
FIG. 6 is a flowchart showing an exhaust route selecting and adsorption catalyst heating routine performed by a controller shown in FIG. 1.

When an ignition key (not shown) is turned on to start the engine 10, the processor of the controller 80 executes the exhaust route selecting and adsorption catalyst heating routine shown in FIG. 6.

Specifically, the processor, after reading the output of the temperature sensor 70, which represents the temperature of the three way catalyst 20, first determines whether the three way catalyst temperature is not lower than a predetermined temperature, about 350° C., at which the activation of the three way catalyst 20 is completed, on the basis of the temperature sensor output (Step S1). At the cold start of engine or in the like case, the three way catalyst temperature is lower than the predetermined value; therefore, the determination result in Step S1 becomes No. In this case, the processor sends a control output of, for example, high level to the solenoid 56b of the solenoid valve 56 to energize the solenoid (Step S2).

As a result, a core (not shown), which is installed at the base of the valve element 56a, is electromagnetically attracted by the solenoid 56b, so that the valve element 56a is moved back to open the solenoid valve 56. Therefore, the admission of the atmospheric air through the filter 56c is interrupted, and the negative pressure in the surge tank 12a is introduced into the pressure chamber 54b of the negative pressure responsive valve 54 through the pipe 55, so that the diaphragm 54a of the valve 54 is moved back toward the inside. With this movement of the diaphragm, the three way valve 51 rotates integrally with the rotating shaft 52 connected to the diaphragm 54a via the link mechanism 53, so that the three way valve 51 takes the second operating position (FIG. 5) where the communication between the bypass exhaust gas passage 30 and the main exhaust gas passage 13 at the upstream end 31 of the bypass exhaust gas passage 30 is allowed. As a result, exhaust gas flows into the bypass exhaust gas passage 30. The HC contained in the exhaust gas after passing through the non-activated three way catalyst 20 is adsorbed onto the adsorption catalyst 40 arranged in the bypass exhaust gas passage 30. The exhaust gas from which HC has been removed is discharged to the atmosphere through the downstream portion of the bypass exhaust gas passage 30, the downstream portion of the main exhaust gas passage 30, which is communicated to the bypass exhaust gas passage 30 at the second intermediate portion corresponding to the downstream end 32 of the bypass exhaust gas passage 30, and a muffler (not shown).

As described above, when the three way valve 51 takes the second operating position, the first intermediate portion of the main exhaust gas passage 13 corresponding to the upstream end 31 of the bypass exhaust gas passage 30 can be connected to the downstream portion of the main exhaust gas passage 13 through the bypass exhaust gas passage 30 only. The direct communication between the intermediate portion of the main exhaust gas passage 13 and the downstream portion thereof is inhibited by the three way valve 51. Therefore, the exhaust gas always passes through the adsorption catalyst 40 before being discharged to the atmosphere. Even if the activation of the three way catalyst 20 has not yet been completed, the exhaust gas containing HC is scarcely discharged to the atmosphere.

As long as it is judged that the three way catalyst temperature does not reach the predetermined value, the above-described Steps S1 and S2 are executed repeatedly.

Afterwards, when it is judged in Step S1 that the three way catalyst temperature has reached the predetermined value, the processor sends a control output of, for example, low level to the solenoid 56b to deenergize the solenoid (Step S3). As a result, the electromagnetic attracting force of the solenoid 56b disappears, so that the valve element 56a is moved forward, thereby closing the solenoid valve 56. Therefore, the admission of negative pressure to the pressure chamber 54b of the negative pressure responsive valve 54 through the pipe 55 is interrupted; meanwhile, the atmospheric air is introduced into the pressure chamber 54b through the filter 56c, so that the diaphragm 54a is moved forward toward the outside by the spring force of the spring 54c. With this movement of the diaphragm, the three way valve 51 rotates via the link mechanism 53 and the rotating shaft 52, so that the three way valve 51 takes the first operating position (FIGS. 1 and 4) where the communication between the bypass exhaust gas passage 30 and the main exhaust gas passage 13 at the upstream end 31 of the bypass exhaust gas passage 30 is interrupted.

As a result, a further flow of the exhaust gas into the bypass exhaust gas passage 30 is inhibited. Thereafter, the exhaust gas temperature increases with the increase in the three way catalyst temperature, but the adsorption catalyst 40 is not exposed to new exhaust gas of high temperature. Therefore, there is no disadvantage that the HC which has once been adsorbed onto the adsorption catalyst 40 is desorbed from the adsorption catalyst by the increase in adsorption catalyst temperature, and flows out together with the flow of the exhaust gas.

The state in which the communication between the first intermediate portion of the main exhaust gas passage 13, corresponding to the upstream end 31 of the bypass exhaust gas passage 30, and the downstream portion of the main exhaust gas passage 13 is interrupted by the three way valve 51 is relieved. Therefore, the exhaust gas is discharged to the atmosphere through the main exhaust gas passage 13. In this case, the three way catalyst temperature has already reached the predetermined value, and therefore the activation of the three way catalyst 20 has already been completed, so that HC and other harmful matters contained in the exhaust gas from the engine 10 are removed by the three way catalyst 20. Therefore, there is no specific trouble.

In Step S4 following Step S3, the processor sends a control output of, for example, high level to the electromagnetic relay of the heater switch 61 to close the normally open type switch contacts of the heater switch 61, thereby completing the exhaust route selecting and adsorption catalyst heating routine. When the switch contacts of the heater switch 61 are closed, electric power is supplied from the battery 62 to the heater 60 via the heater switch 61, so that the adsorption catalyst 40 is heated by the heater 60.

Afterwards, when the adsorption catalyst temperature reaches a predetermined value, e.g., about 120° C. and enters a predetermined temperature range of about 120° to about 200° C., the self-oxidation function of the adsorption catalyst 40 is performed. Specifically, the HC adsorbed onto the adsorption catalyst 40 is oxidized by the oxygen which is present around the adsorption catalyst 40 to form harmless carbon dioxide, water, etc. The gas containing carbon dioxide etc. is discharged to the outside of the apparatus together with the flow of the exhaust gas flowing in the main exhaust gas passage 13. Because the adsorbed HC is purified as described above, the adsorption catalyst 40 is regenerated to the state in which the adsorption catalyst 40 is capable of adsorbing HC at the next cold start of engine or in the like case.

The exhaust gas purifying apparatus in accordance with the above first embodiment shown in FIG. 1 can be modified in various ways.

For example, with the apparatus of this embodiment, the three way valve 51, which is the main element of the exhaust route selecting means 50, has been disposed at the upstream end 31 of the bypass exhaust gas passage 30 to selectively inhibit the communication between the bypass exhaust gas passage and the main exhaust gas passage at the upstream end of the bypass exhaust gas passage. However, in the exhaust gas purifying apparatus which is configured so that both ends of the bypass exhaust gas passage connect to the main exhaust gas passage, the three way valve 51 may be disposed at the downstream end 32 of the bypass exhaust gas passage. Alternatively, the three way valve 51 may be disposed at both of the upstream and downstream ends of the bypass exhaust gas passage. The bypass exhaust gas passage 30 may be configured so as to connect to the main exhaust gas passage 13 at its upstream end only.

The exhaust route selecting means 50 is not limited to the type of this embodiment which is a combination of the three way valve 51 consisting of a plate-shaped member, the negative pressure responsive valve 54, electromagnetic solenoid valve 56, etc. For example, the selecting means 50 may be configured by a control valve, which is driven by a pneumatic or hydraulic source equipped on a vehicle, or the like.

Although the three way catalyst temperature has been detected by the temperature sensor in this embodiment, the exhaust gas temperature may be detected near the three way catalyst, for example, just on the downstream side of the three way catalyst. Also, it is not indispensable to automatically control the operation of the exhaust route selecting means 50 by means of the controller 80 which responds to the temperature sensor output. The operation of the element 50 can be performed manually by turning the electromagnetic solenoid valve 56 on via a manual switch or by other methods.

Although the heater 60, which is installed separately from the adsorption catalyst 40, has been used as heating means in this embodiment, the heating means may be installed integrally with the adsorption catalyst 40. For example, an electrically heated catalyst support coated with an adsorbent composing the adsorption catalyst 40 may be used.

Also, in the above embodiment, the heater 60 has been turned on simply following the interruption of the communication between the bypass exhaust gas passage 30 and the main exhaust gas passage 13 in Step S3 in FIG. 6. However, the heater 60 may be on/off controlled so that the adsorption catalyst temperature is maintained within a predetermined temperature range. Further, it is not indispensable to start the heating of the adsorption catalyst 40 at the same time as the communication between the bypass exhaust gas passage and the main exhaust gas passage is interrupted. The heating of the adsorption catalyst may be started before the communication between the exhaust gas passages is interrupted unless the timing is such that the adsorption catalyst temperature does not reach the temperature at which the desorption of the adsorbed HC proceeds. Also, it is not indispensable to automatically control the operation of the heater 60 by means of the controller 80. The operation of the heater 60 may be controlled by manually operating the heater switch 61 or by other methods.

An exhaust gas purifying apparatus in accordance with a second embodiment of the present invention will be described below.

Figure 7:
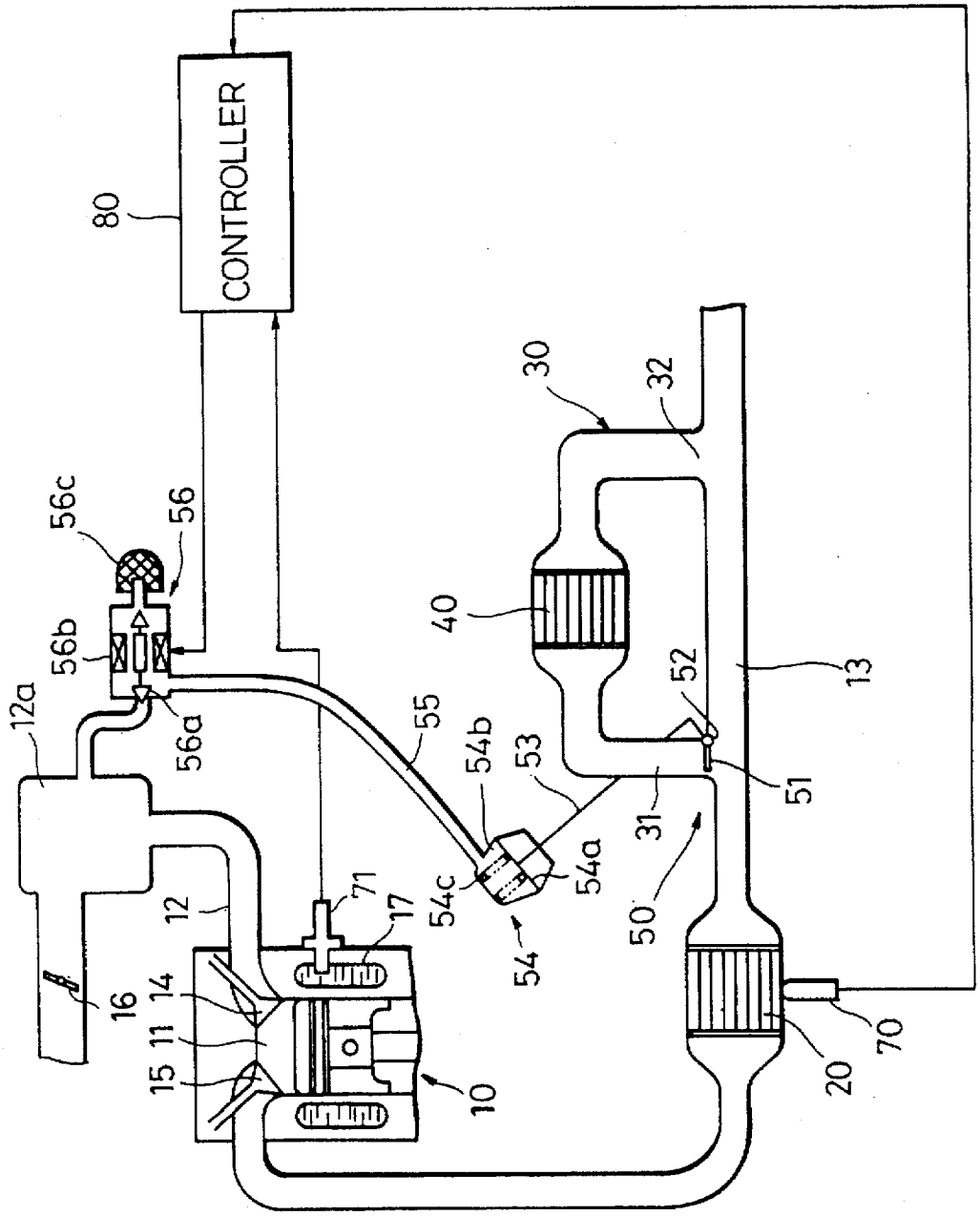
FIG. 7 is a schematic view showing an exhaust gas purifying apparatus in accordance with a second embodiment of the present invention, together with peripheral elements thereof.

The apparatus of this embodiment is common to the apparatus of the first embodiment (FIG. 1) in that the hydrocarbon purifying performance is enhanced and the system configuration for the after-treatment of hydrocarbon adsorbed onto the adsorption catalyst is simplified, and is basically configured in the same manner as the apparatus shown in FIG. 1, as shown in FIG. 7. Therefore, the detailed description of the apparatus is omitted.

On the other hand, the apparatus of this embodiment differs from the apparatus of the first embodiment provided with the adsorption catalyst heating device 60 to 62 in that the need for adsorption catalyst heating device is eliminated. In the apparatus of this embodiment, the adsorption catalyst can be heated without the use of the heating device. For this purpose, even when the communication between the bypass and main exhaust gas passages is interrupted by the exhaust route selecting means, the flow of the exhaust gas into the bypass exhaust gas passage is not completely interrupted, and part of the exhaust gas is allowed to flow into the bypass exhaust gas passage so as to heat the adsorption catalyst by the exhaust gas thus entered.

Therefore, the external shape and size of the plate-shaped member (plate-shaped closing member) composing the three way valve 51 are substantially the same as the shape and size of the internal cross section of the main exhaust gas passage 13 at the first intermediate portion, which are smaller than the shape and size of the internal cross section of the bypass exhaust gas passage 30 at the upstream end 31. For example, when the shape of the internal cross section of the bypass exhaust gas passage 30 at the upstream end 31, the shape of the internal cross section of the main exhaust gas passage 13 at the first intermediate portion, and the external shape of the plate-shaped closing member (three way valve 51) are rectangular, the length in the lengthwise direction of the plate-shaped closing member is shorter than the length in the lengthwise direction of the bypass exhaust gas passage by a predetermined percentage, e.g., about 5%, and is substantially the same as the length in the lengthwise direction of the main exhaust gas passage 13.

Figure 8:
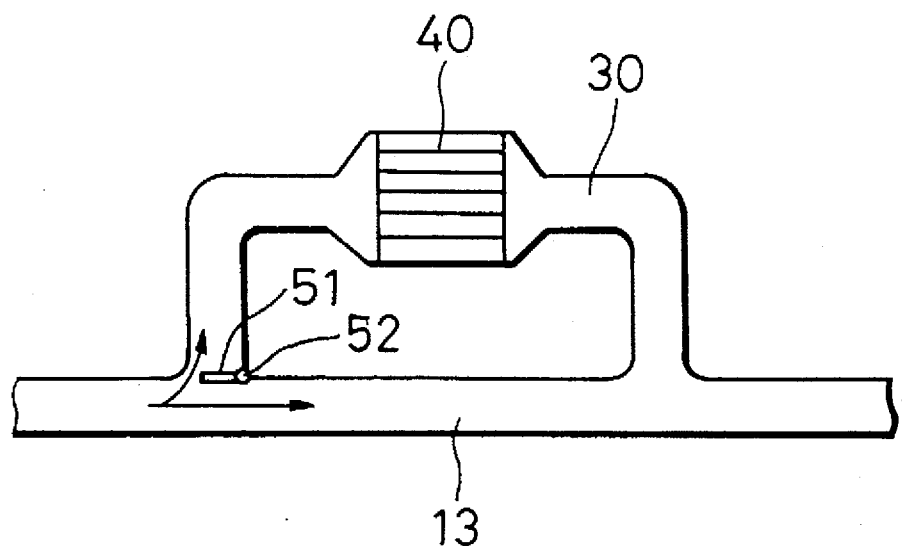
FIG. 8 is a fragmentary view showing a state in which the communication between a bypass exhaust gas passage and a main exhaust gas passage is inhibited by a three way valve shown in FIG. 7 while partial admission of exhaust gas into the bypass exhaust gas passage being allowed.

When the three way valve 51 takes the first operating position as shown in FIGS. 7 and 8 (corresponding to FIGS. 1 and 4), a gap is formed between the tip end of the three way valve 51 and the internal peripheral surface of the connecting portion of the exhaust passages 13 and 30, which faces the tip end of the three way valve 51, so that part of, e.g., about 5% of the exhaust gas flowing out of the three way catalyst 20 flows from the main exhaust gas passage 13 to the bypass exhaust gas passage 30 through this gap.

When the solenoid valve 56 is opened to admit negative pressure into the pressure chamber 54b of the negative pressure responsive valve 54 so that the diaphragm 54a is moved back toward the inside, the three way valve 51, whose shape and size are substantially the same as those of the internal cross section of the main exhaust gas passage 13, takes the second operating position (FIG. 5) for allowing the communication between the bypass exhaust gas passage 30 and the main exhaust gas passage 13. In this case, the exhaust gas flows into the bypass exhaust gas passage 30, and the flow of the exhaust gas passing through the main exhaust gas passage 13 only is interrupted.

Referring to FIG. 7, reference numeral 71 denotes a water temperature sensor for detecting the temperature of engine cooling water and producing an output representing the temperature of engine cooling water. The sensor 71 is mounted to the engine 10 so that its temperature detecting portion is arranged in an engine cooling water passage formed in the cylinder wall of the engine 10, and is electrically connected to the controller 80.

The operation of the exhaust gas purifying apparatus shown in FIG. 7 will be described below.

Figure 9:
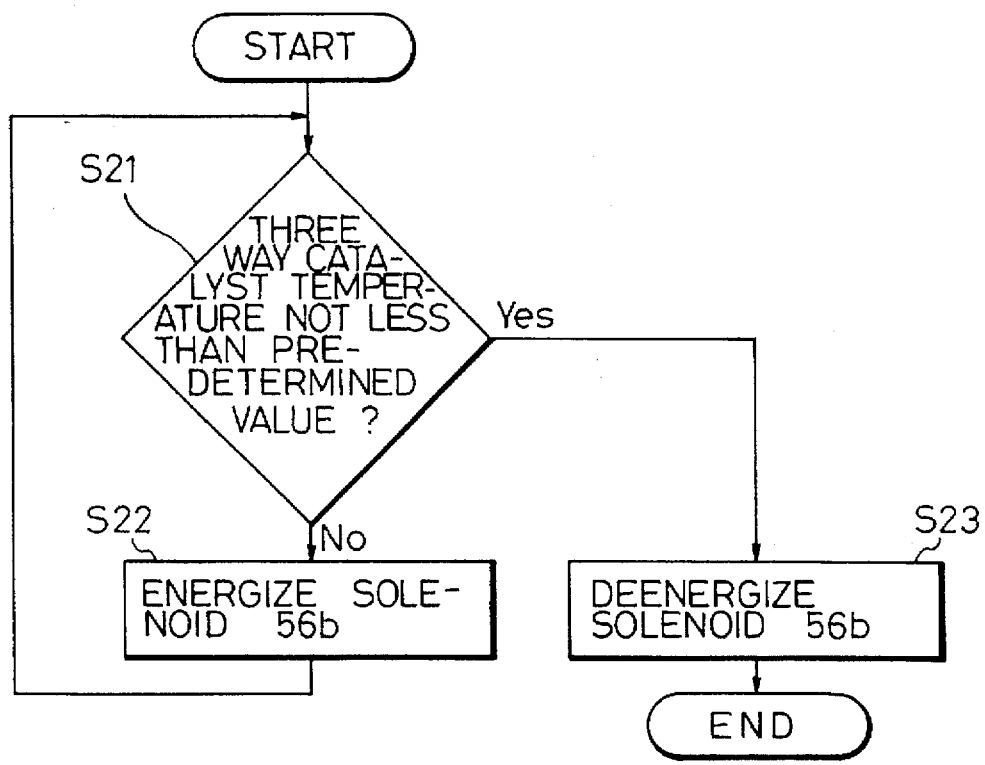
FIG. 9 is a flowchart showing an exhaust route selecting routine performed by a controller shown in FIG. 7.

When the engine is started, the processor of the controller 80 executes the exhaust route selecting (exhaust route switching) routine shown in FIG. 9. The routine includes Steps S21 to S23 corresponding to Steps S1 to S3 in FIG. 6, respectively.

The steps will be explained briefly. If it is judged in Step 21, on the basis of the output of the catalyst temperature sensor 70, that the three way catalyst temperature is lower than a predetermined value, the processor energizes the solenoid 56b of the solenoid valve 56 (Step S22). As a result, the solenoid valve 56 is opened, and negative pressure is admitted into the pressure chamber 54b of the negative pressure responsive valve 54, so that the diaphragm 54a of the valve 54 is moved back toward the inside. With this movement of the diaphragm, the three way valve 51 takes the second operating position (FIG. 5) for allowing the communication between the bypass exhaust gas passage 30 and the main exhaust gas passage 13. As a result, exhaust gas flows into the bypass exhaust gas passage 30. The HC contained in the exhaust gas after passing through the non-activated three way catalyst 20 is adsorbed onto the adsorption catalyst 40 arranged in the bypass exhaust gas passage 30.

Afterwards, if it is judged in Step S21 that the three way catalyst temperature reaches the predetermined value, the processor deenergizes the solenoid 56b (Step S23), ending the exhaust route selecting routine in FIG. 9. When the solenoid 56b is deenergized and the solenoid valve 56 is closed, the admission of negative pressure into the pressure chamber 54b of the negative pressure responsive valve 54 is shut off, so that the diaphragm 54a is moved forward. Thereupon, the three way valve 51 takes the first operating position (FIGS. 7 and 8) for checking the communication between the bypass exhaust passage 30 and the main exhaust gas passage 13.

As a result, most of further flow of the exhaust gas into the bypass exhaust gas passage 30 is inhibited. On the other hand, part of the exhaust gas flows from the main exhaust gas passage 13 to the bypass exhaust gas passage 30 through the gap formed between the tip end of the three way valve 51 and the internal peripheral surface of the connecting portion of the exhaust passages 13 and 30, which faces the tip end of the three way valve 51.

Thereafter, when the exhaust gas temperature increases with the increase in the engine temperature and the three way catalyst temperature, the adsorption catalyst 40 is heated by part of the exhaust gas flowing into the bypass exhaust gas passage 30, so that the adsorption catalyst temperature increases. The quantity of the exhaust gas flowing into the bypass exhaust gas passage 30 is limited, for example, to about 5% of the total quantity of exhaust gas. Therefore, there is no disadvantage that the HC which has once been adsorbed onto the adsorption catalyst 40 is desorbed from the adsorption catalyst by the overheating of the adsorption catalyst, and flows out together with the flow of the exhaust gas.

The state in which the communication between the first intermediate portion of the main exhaust gas passage 13, corresponding to the upstream end 31 of the bypass exhaust gas passage 30, and the downstream portion of the main exhaust gas passage 13 is interrupted by the three way valve 51 is relieved. Therefore, the exhaust gas is discharged to the atmosphere through the main exhaust gas passage 13.

Afterwards, when the adsorption catalyst temperature reaches the predetermined value, the self-oxidation function of the adsorption catalyst 40 is performed, so that the HC adsorbed onto the adsorption catalyst 40 turns to harmless dioxide, water, etc.

The exhaust gas purifying apparatus in accordance with the second embodiment shown in FIG. 7 can be modified in various ways.

For example, the exhaust gas purifying apparatus shown in FIG. 7 can be modified as with the case of the modifications of the first embodiment. That is to say, in the exhaust gas purifying apparatus which is configured so that the both ends of the bypass exhaust gas passage are connected to the main exhaust gas passage, the three way valve 51 may be disposed at the downstream end 32 of the bypass exhaust gas passage. Alternatively, the three way valve 51 may be disposed at both of the upstream and downstream ends of the bypass exhaust gas passage. In this case, the three way valve disposed at the downstream end 32 of the bypass exhaust gas passage is adapted to allow part of the exhaust gas to flow from the bypass exhaust gas passage to the main exhaust gas passage. Also, the bypass exhaust gas passage 30 may be configured so as to connect to the main exhaust gas passage 13 at the upstream end only. The exhaust route selecting means 50 may be configured by a control valve, which is driven by a pneumatic or hydraulic source equipped on a vehicle, or the like. Instead of the detection of the three way catalyst temperature, the exhaust gas temperature near the three way catalyst may be detected. Further, the exhaust route selecting means 50 may be controlled manually.

In this embodiment, in order to introduce part of the exhaust gas into the bypass exhaust gas passage, the three way valve 51 has consisted of a rectangular plate-shaped closing member, and the length in the lengthwise direction of the closing member has been set so as to be shorter than the length in the lengthwise direction of the bypass exhaust gas passage 30 of a rectangular cross section at the upstream end 31 thereof and equal to the length in the lengthwise direction of the main exhaust gas passage of a rectangular cross section. However, the system configuration capable of introducing part of the exhaust gas is not limited to this configuration.

For example, when the bypass exhaust passage 30 and the main exhaust gas passage 13 are configured so as to have the same shape and size, the shape and size of the closing member is made smaller than those of both the exhaust gas passages so that a gap is formed between the tip end of the closing member and the internal peripheral surface of each exhaust gas passage when the closing member takes the first or second operating position, and a protrusion, which abuts on the closing member at the second operating position, may be provided on the internal peripheral surface of the main exhaust gas passage 13 to fill the gap between the tip end of the closing member and the internal peripheral surface of the main exhaust gas passage 13.

Although an exhaust gas purifying apparatus mounted on a vehicle has been described in the above second embodiment, this embodiment may be applied to a machine other than the vehicle, such as a boiler.

Although the exhaust route has been changed over by the three way valve 51 when the main catalyst temperature has reached a predetermined value in this embodiment, the exhaust route changeover timing can be set variously.

Figure 10:
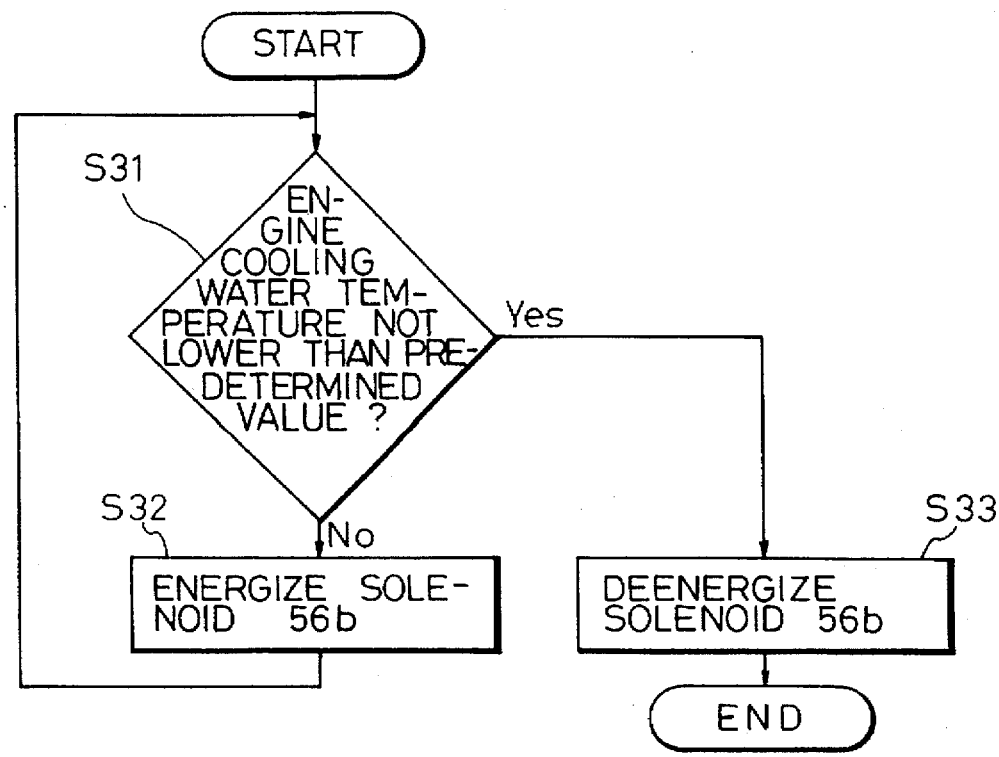
FIG. 10 is a flowchart showing a modification of the exhaust route selecting routine shown in FIG. 9.

For example, when the exhaust route is changed over in accordance with the engine cooling water temperature, serving as a parameter value relating to the engine temperature, the processor of the controller 80, after reading the output of the water temperature sensor 71 (FIG. 7) representing the engine cooling water temperature in the exhaust route selecting routine shown in FIG. 10, first determines, on the basis of the output of the temperature sensor, whether the detected engine cooling water temperature is not lower than a predetermined temperature, e.g., about 40° C. representing the completion of the warming up of the engine 10 and in turn the completion of the activation of the three way catalyst 20 (Step S31). Then, the processor executes one of Steps S32 and S33, corresponding to Steps S22 and S23 in FIG. 9, respectively, in accordance with the determination result. In place of the engine cooling water temperature, the engine lubricating oil temperature, the suction air temperature, etc. may be used as a parameter value relating to the engine temperature.

Figure 11:
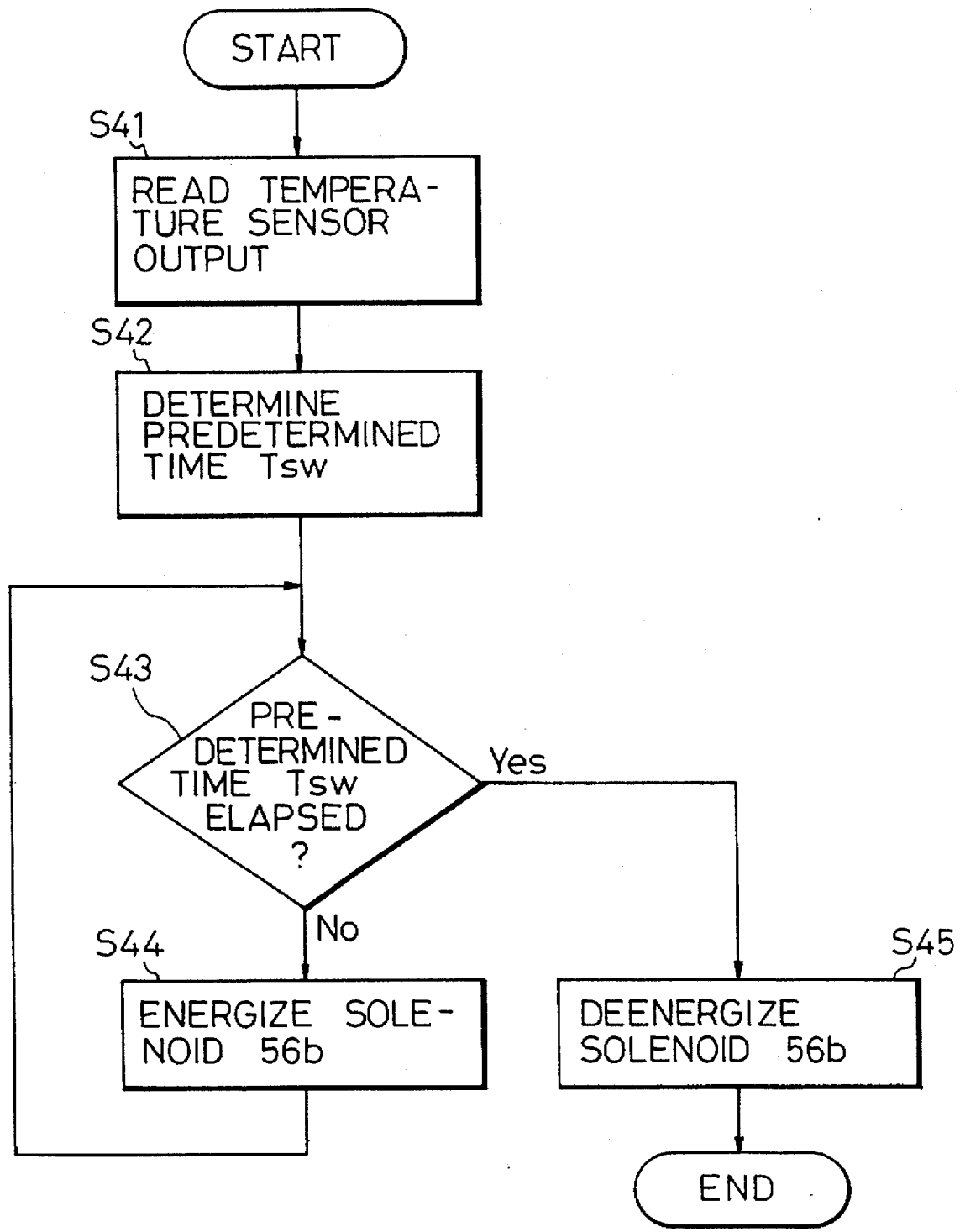
FIG. 11 is a flowchart showing another modification of the exhaust route selecting routine.

Alternatively, the exhaust route may be changed over when a predetermined time, which is specified in accordance with the engine cooling water temperature at the engine start, has elapsed. In this case, the processor of the controller 80, as shown in FIG. 11, reads the output of the temperature sensor 71 representing the detected engine cooling water temperature (Step S41), and then determines the predetermined time $T_{SW}$ in accordance with the detected engine cooling water temperature by referring to a map shown, by way of example, in FIG. 12, which has been set in advance and stored in the memory of the controller 80 (Step S42). The processor sets a timer (not shown) incorporated in the controller 80 for the predetermined time $T_{SW}$, and starts the timer. Then, the processor determines whether the predetermined time $T_{SW}$ has elapsed from the engine start, by referring to the timer (Step S43). If this determination result is No, the processor energizes the solenoid 56b in Step S44 corresponding to Step 22 in FIG. 9. Afterwards, if it is judged in Step S43 that the predetermined time $T_{SW}$ has elapsed from the engine start, the processor executes Step S45 corresponding to Step S23 in FIG. 9.

Figure 13:
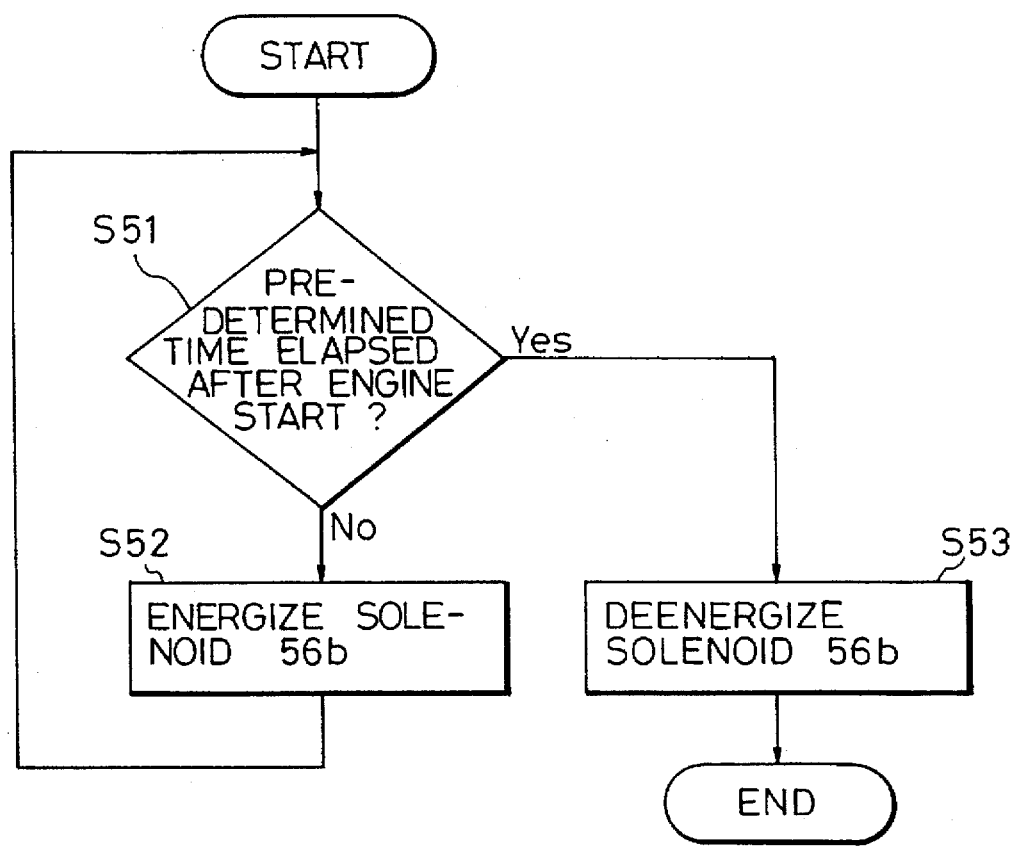
FIG. 13 is a flowchart showing still another modification of the exhaust route selecting routine.

Alternatively, the exhaust route may be changed over when a predetermined time usually required for the completion of the warming up of the engine 10 and in turn the completion of the activation of the three way catalyst 20, e.g., about 60 seconds has elapsed from the engine start. In this case, as shown in FIG. 13, the processor monitors the timer set for the predetermined time at the engine start, and determines whether the predetermined time has elapsed from the engine start (Step S51). Then, the processor executes one of Steps S52 and S53 corresponding to Steps S22 and S23 in FIG. 9, respectively, in accordance with the determination result.

Next, an exhaust gas purifying apparatus in accordance with a third embodiment of the present invention will be described below.

The apparatus of this embodiment is common to the apparatus (FIG. 7) of the second embodiment in that it requires no adsorption catalyst heating device, but differs from the apparatus of the second embodiment, in which the adsorption catalyst is heated by using part of the exhaust gas, in that the adsorption catalyst is heated by arranging the main catalyst and the adsorption catalyst so that heat can be transferred from the main catalyst to the adsorption catalyst.

Figure 14:
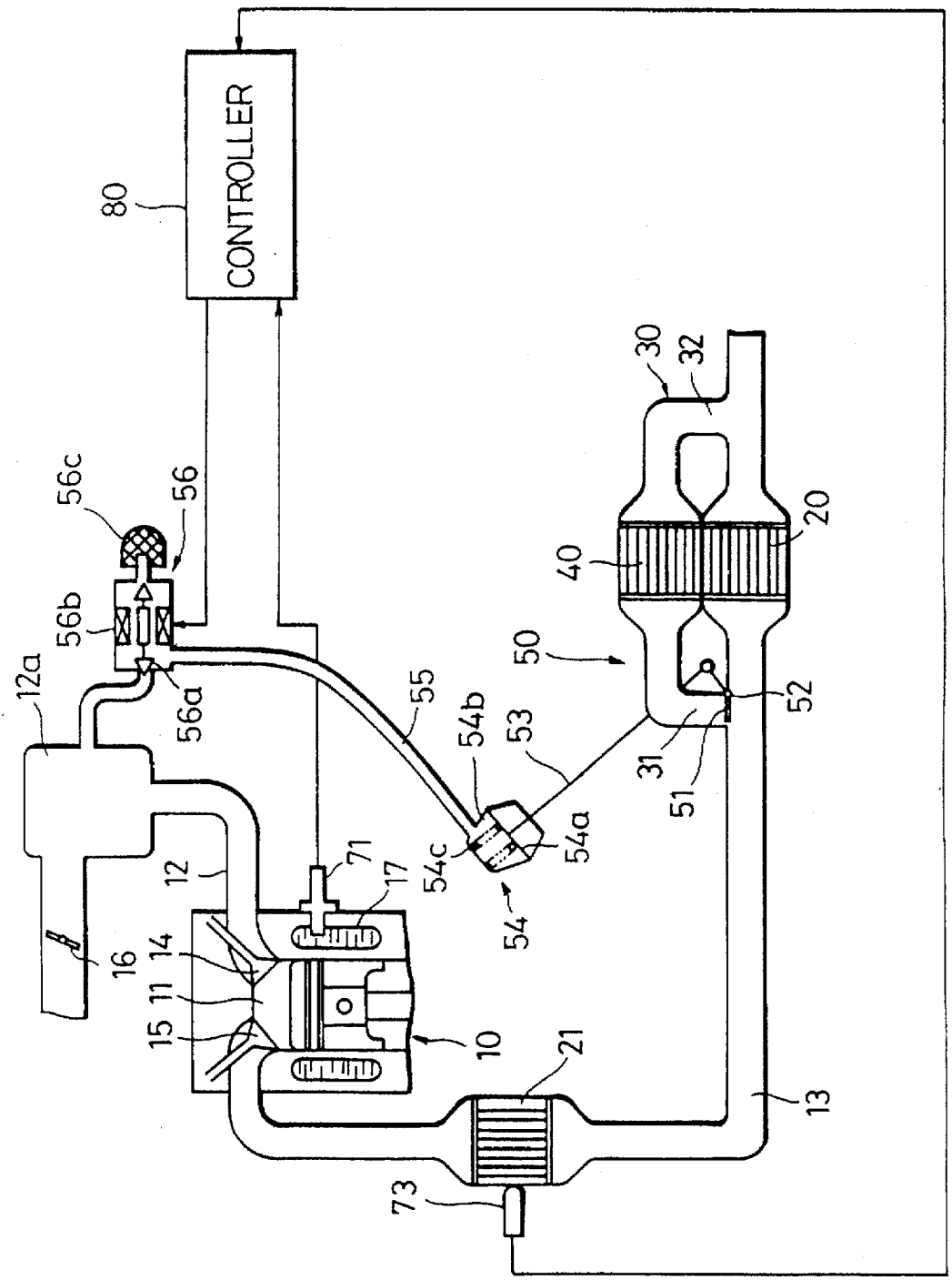
FIG. 14 is a schematic view showing an exhaust gas purifying apparatus in accordance with a third embodiment of the present invention, together with peripheral elements thereof.

As shown in FIG. 14, the exhaust gas purifying apparatus of this embodiment is configured in substantially the same manner as the apparatus shown in FIG. 7; therefore, the description of the configuration common to FIGS. 7 and 14 is omitted.

Referring to FIG. 14, the main exhaust gas passage 13 is provided with an exhaust gas purifying preliminary catalyst 21, which preferably consists of a three way catalyst, in addition to an exhaust gas purifying catalytic converter 20 serving as a main catalyst. Preferably, the preliminary catalyst 21 is small in size and has a low heat capacity so that it can be heated rapidly for activation as the engine temperature increases.

The bypass exhaust gas passage 30 extends adjacently to and parallel with the main exhaust gas passage 13. The adsorption catalyst 40 disposed at the halfway position of the bypass exhaust gas passage 30 adjoins the three way catalyst 20 via the walls of the bypass exhaust gas passage 30 and the main exhaust gas passage 13. Therefore, heat can be transferred from the three way catalyst 20 to the adsorption catalyst 40.

A catalyst temperature sensor 73 for detecting the preliminary catalyst temperature and producing an output representing the preliminary catalyst temperature is disposed so that, for example, its temperature detecting portion abuts on or is inserted into the preliminary catalyst 21.

The operation of the exhaust gas purifying apparatus shown in FIG. 14 will be described below.

This apparatus basically operates in the same manner as the apparatus shown in FIG. 7. However, whereas the exhaust route is selected on the basis of the output from the catalyst temperature sensor 70, representing the temperature of the three way catalyst 20, being the main catalyst, in the apparatus shown in FIG. 7, the exhaust route is selected on the basis of the output from the catalyst temperature sensor 73, representing the preliminary catalyst temperature in the apparatus shown in FIG. 14. When the engine is started, the processor of the controller 80 executes the exhaust route selecting (exhaust route switching) routine shown in FIG. 17 corresponding to FIG. 9.

The steps will be explained briefly. If it is judged in Step 61, on the basis of the output of the catalyst temperature sensor 73, that the preliminary catalyst temperature is lower than a predetermined value, e.g., about 350° C. at which the activation of the preliminary catalyst 21 is completed, the processor energizes the solenoid 56b of the solenoid valve 56 (Step S62).

Figure 16:
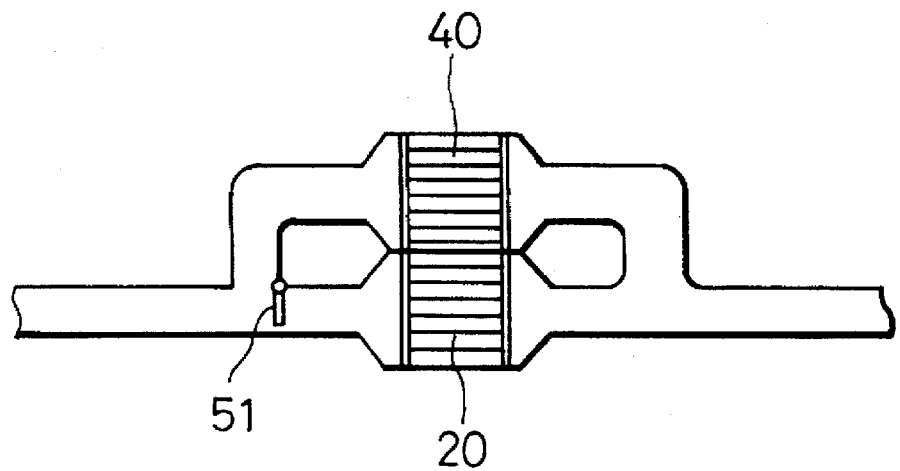
FIG. 16 is a fragmentary view showing a state in which the three way valve is at an operating position at which the communication between the bypass exhaust gas passage and the main exhaust gas passage is established.

As a result, the solenoid valve 56 is opened, and negative pressure in the surge tank 12a is admitted into the pressure chamber 54b of the negative pressure responsive valve 54, so that the diaphragm 54a of the valve 54 is moved back. With this movement of the diaphragm, the three way valve 51 takes the second operating position (FIG. 16) for allowing the communication between the bypass exhaust gas passage 30 and the main exhaust gas passage 13. As a result, exhaust gas flows into the bypass exhaust gas passage 30. The HC contained in the exhaust gas after passing through the non-activated preliminary catalyst 21 is adsorbed onto the adsorption catalyst 40 arranged in the bypass exhaust gas passage 30. The exhaust gas necessarily passes the adsorption catalyst 40 before it is discharged to the atmosphere. Thus, even if the activation of the preliminary catalyst 21 and the three way catalyst 20 has not yet been completed, the exhaust gas containing HC is scarcely discharged to the atmosphere.

Figure 15:
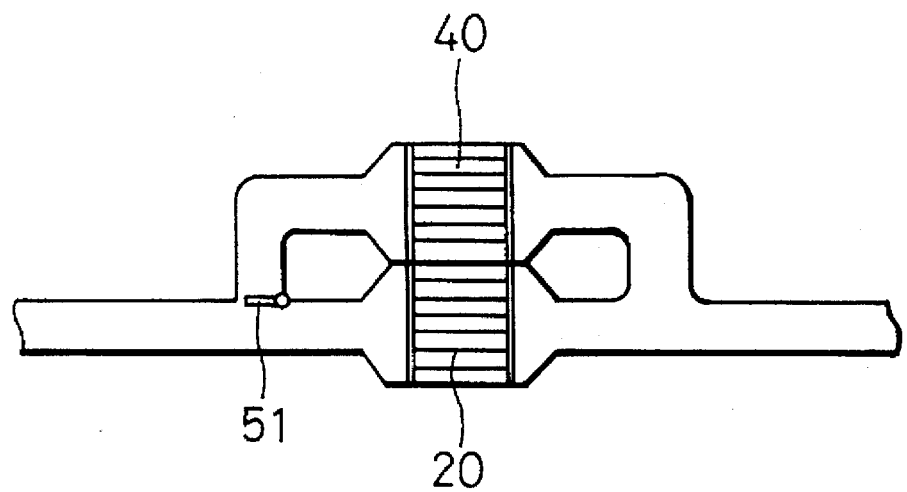
FIG. 15 is a fragmentary view showing a state in which the communication between a bypass exhaust gas passage and a main exhaust gas passage is inhibited by a three way valve shown in FIG. 14.
Figure 17:
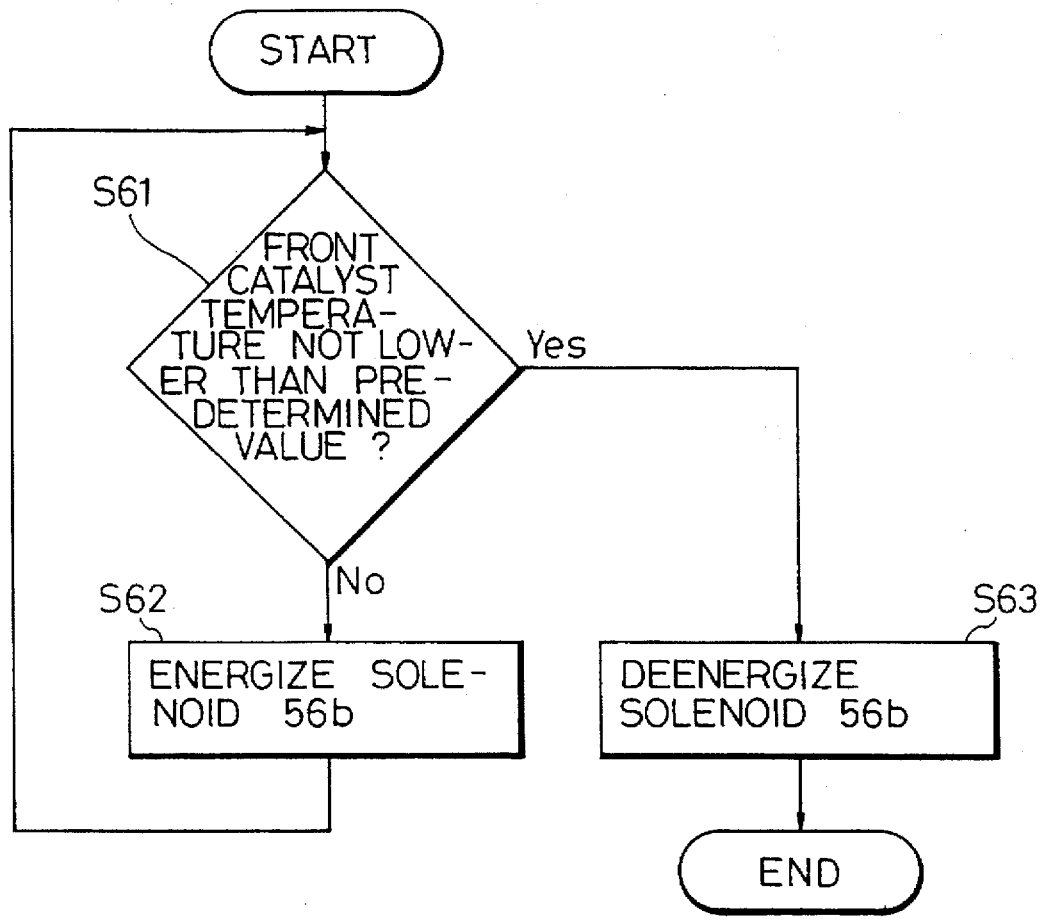
FIG. 17 is a flowchart showing an exhaust route selecting routine performed by a controller shown in FIG. 14.

Afterwards, if it is judged in Step S61 that the preliminary catalyst temperature reaches the predetermined value, the processor deenergizes the solenoid 56b (Step S63), ending the exhaust route selecting routine in FIG. 17. When the solenoid 56b is deenergized and the solenoid valve 56 is closed, the admission of negative pressure into the pressure chamber 54b of the negative pressure responsive valve 54 is interrupted, so that the diaphragm 54a is moved forward. With this movement of the diaphragm, the three way valve 51 takes the first operating position (FIGS. 14 and 15) for checking the communication between the bypass exhaust passage 30 and the main exhaust gas passage 13, so that further flow of the exhaust gas into the bypass exhaust gas passage 30 is inhibited.

When the preliminary catalyst temperature and in turn the three way catalyst temperature are increased,-heat is transferred from the main catalyst 20 to the adsorption catalyst 40, so that the adsorption catalyst 40 is heated, thereby increasing the adsorption catalyst temperature. At this time, the adsorption catalyst is not overheated by the heat transfer from the main catalyst 20 to the adsorption catalyst 40. Therefore, there is no disadvantage that the HC which has once been adsorbed onto the adsorption catalyst 40 is desorbed from the adsorption catalyst by the increased adsorption catalyst temperature, and flows out together with the flow of the exhaust gas.

On the other hand, the exhaust gas is discharged to the atmosphere via the main exhaust gas passage 13. Since the preliminary catalyst temperature has already reached the predetermined value and the activation of the preliminary catalyst 21 has already be completed, HC and other harmful matters contained in the exhaust gas from the engine 10 are removed by the preliminary catalyst 21. Therefore, there is no specific trouble.

Thereafter, when the adsorption catalyst temperature reaches a predetermined value, e.g., about 120° C., the self-oxidation function of the adsorption catalyst 40 is performed. Further, when the engine 10 is operated in an ordinary operation region, the activation of the main catalyst 20 is completed by that time. Therefore, the exhaust gas from the engine, whose quantity increases with the ordinary engine operation, is purified by both the preliminary catalyst 21 and the main catalyst 20.

The exhaust gas purifying apparatus in accordance with this embodiment shown in FIG. 14 can be modified in various ways.

For example, the exhaust gas purifying apparatus shown in FIG. 14 can be modified as with the case of the modifications of the first and second embodiment. That is to say, this apparatus can be applied to a machine other than the vehicle. The three way valve 51 may be disposed at the downstream end 32 of the bypass exhaust gas passage, or may be disposed at both of the upstream and downstream ends of the bypass exhaust gas passage. Further, the bypass exhaust gas passage 30 may be configured so as to connect to the main exhaust gas passage 13 at the upstream end only. The exhaust route selecting means 50 may be configured by a pneumatic or hydraulic control valve. The exhaust route selecting means can be controlled manually. Also, in place of the front catalyst temperature, the exhaust gas temperature near the preliminary catalyst, for example, just on the downstream side of the preliminary catalyst may be detected.

Although the exhaust route has been changed over by the three way valve 51 when the preliminary catalyst temperature has reached a predetermined value in the above third embodiment, the exhaust route changeover timing can be set variously. For example, the exhaust route may be changed over as with the case of the three modifications (FIGS. 10, 11, and 13) associated with the second embodiment. Specifically, the exhaust route may be switched in accordance with the engine cooling water temperature (or engine lubricating oil temperature, suction air temperature, etc.) as a parameter value relating to the engine temperature, or the exhaust route may be changed over when a predetermined time, which is specified in accordance with the engine cooling water temperature at the engine start, has elapsed, or the exhaust route may be changed over when a predetermined time usually required for the completion of the warming up of the engine 10 and in turn the completion of the activation of the preliminary catalyst 21 or the activation of the preliminary catalyst 21 and the three way catalyst 20, e.g., about 60 seconds has elapsed from the engine start.

In the foregoing third embodiment, the adsorption catalyst 40 has been disposed in the bypass exhaust gas passage 30 extending adjacently to and parallel with the main exhaust gas passage 13 having the main catalyst 20 therein as shown in FIG. 14. However, the configuration and arrangement of both of these catalysts are not limited to the above-described ones, but the configuration and arrangement which permit heat transfer from the main catalyst to the adsorption catalyst are allowed.

Figure 19:
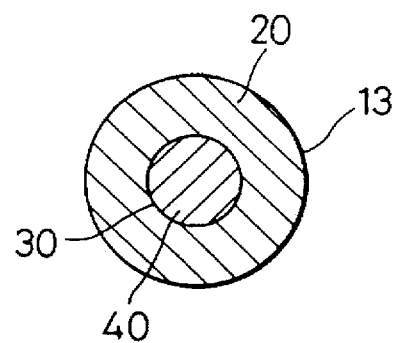
FIG. 19 is a schematic vertical sectional view of the main catalyst and the adsorption catalyst shown in FIG. 18.
Figure 18:
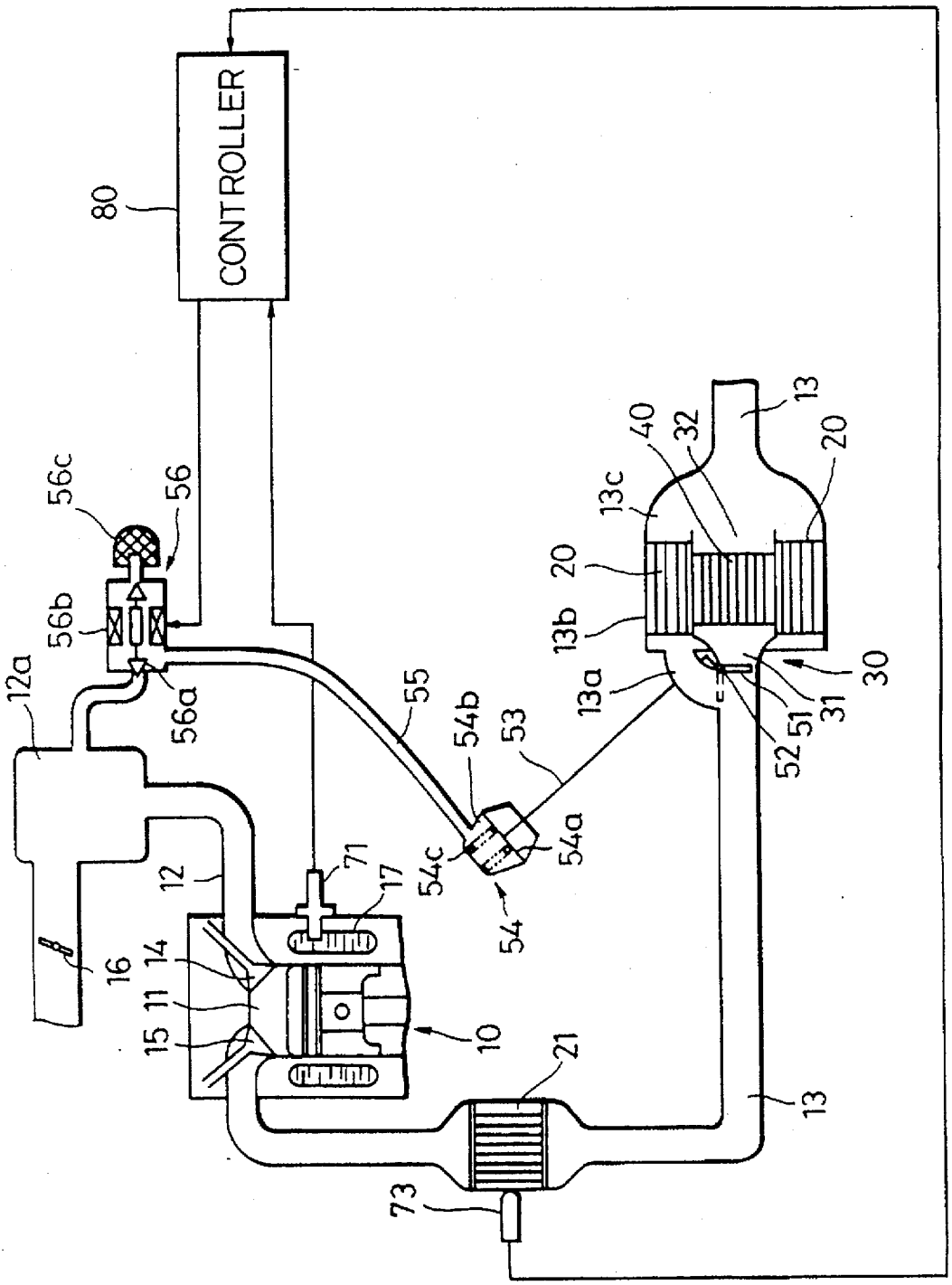
FIG. 18 is a schematic view showing a modification of the arrangement of a main catalyst and an adsorption catalyst.

For example, in the modification shown in FIGS. 18 and 19, the intermediate portion of the main exhaust gas passage 13 is composed of a tube 13a, which communicates with the upstream side of the main exhaust gas passage and has an inside diameter substantially equal to that of the upstream side of the main exhaust gas passage, an annular tube 13b communicating with the tube 13a, and a large-diameter tube 13c, whose both ends communicate with the annular tube and the downstream side of the main exhaust gas passage, respectively. The main catalyst 20 having an annular cross section is disposed in the annular tube 13b. The bypass exhaust gas passage 30 is formed radially inwardly of the annular tube 13b and concentrically therewith, and the outer peripheral surface of the adsorption catalyst 40 disposed in the bypass exhaust gas passage 30 is in contact with the main catalyst 20 via the tube wall of the exhaust gas passage, so that heat is transferred from the main catalyst 20 to the adsorption catalyst 40. The upstream end 31 of the bypass exhaust gas passage 30 is communicated with the upstream side of the main exhaust gas passage 13, while the downstream end 32 thereof is open to the large-diameter tube 13c. When the three way valve 51 takes the first operating position indicated by the solid line in FIG. 18, the communication between the bypass exhaust gas passage 30 and the main exhaust gas passage 13 at the upstream end 31 of the bypass exhaust gas passage is inhibited. On the other hand, when the three way valve 51 takes the second operating position indicated by the broken line in FIG. 18, the communication between both the exhaust gas passages is allowed.

Next, an exhaust gas purifying apparatus in accordance with a fourth embodiment of the present invention will be described below.

The apparatus of this embodiment is common to the apparatuses of the above second and third embodiments (FIGS. 7 and 14) in that the need for adsorption catalyst heating device is eliminated, but differs from the apparatuses of the second and third embodiments in that the adsorption catalyst is heated by disposing the adsorption catalyst in such a manner that one end of the adsorption catalyst is exposed to the main exhaust gas passage as compared with the apparatuses of the second and third embodiments in which the adsorption catalyst is heated by utilizing part of the exhaust gas or by disposing both catalysts so that heat can be transferred from the main catalyst to the adsorption catalyst.

As shown in FIG. 20, the exhaust gas purifying apparatus of this embodiment is configured in substantially the same manner as the apparatus shown in FIG. 14; therefore, the description of the configuration common to FIGS. 14 and 20 is omitted.

Referring to FIG. 20, the upstream end 31 and the downstream end 32 of the bypass exhaust gas passage 30 are communicated with the first intermediate portion 13a of the main exhaust gas passage 13 and the second intermediate portion 13b with a large diameter, located on the downstream side, respectively. The downstream end of the adsorption. catalyst 40 is exposed to the second intermediate portion of the main exhaust gas passage 13. Therefore, the adsorption catalyst 40 is heated by the exhaust gas flowing through the main exhaust gas passage 13. The main catalyst 20 and the adsorption catalyst 40 adjoin to each other via the walls of the exhaust gas passages 13 and 20 so that heat can be transferred between both the catalysts. The three way valve 51, which is disposed at the connecting portion between the upstream end 31 of the bypass exhaust gas passage 30 and the first intermediate portion 13a of the main exhaust gas passage 13 to selectively allow or check the communication between the exhaust gas passages 13 and 30, consists, for example, of a plate-shaped closing member having substantially the same shape as that of the cross section of both the exhaust gas passages.

Figure 21:
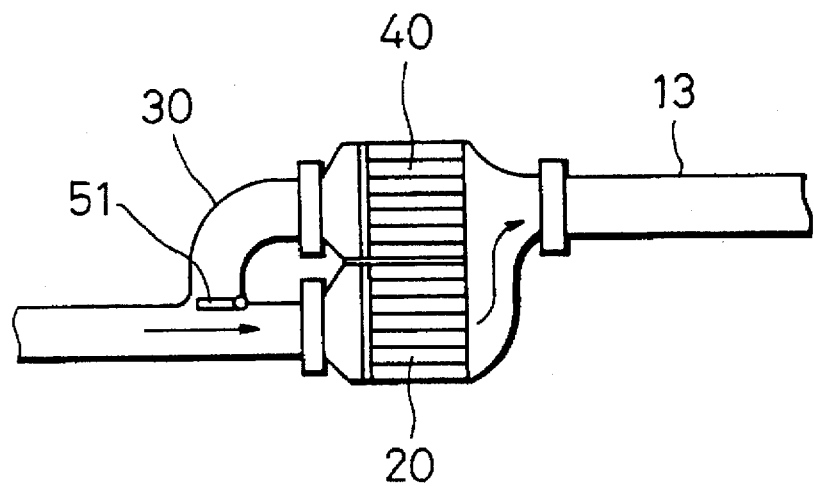
FIG. 21 is a fragmentary view showing a state in which the communication between a bypass exhaust gas passage and a main exhaust gas passage is inhibited by a three way valve shown in FIG. 20.
Figure 22:
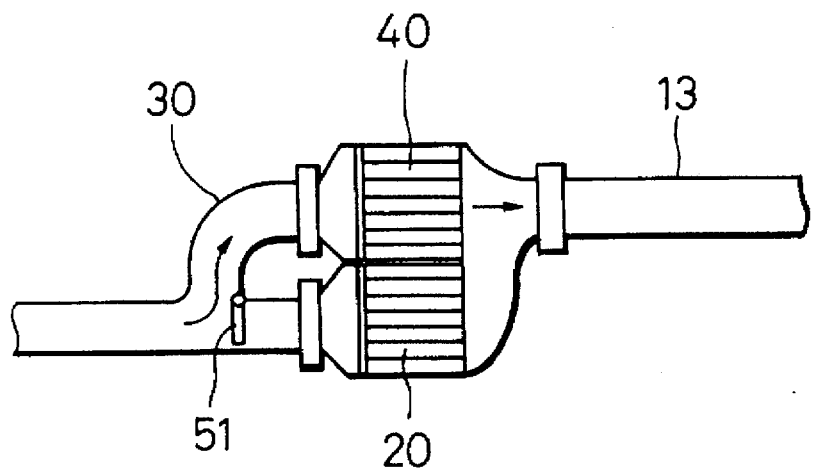
FIG. 22 is a fragmentary view showing a state in which the three way valve is at an operating position at which the communication between the bypass exhaust gas passage and the main exhaust gas passage is established.

The exhaust gas purifying apparatus of this embodiment shown in FIG. 20 operates in the same manner as the apparatus shown in FIG. 14. Therefore, the description of the operation of the apparatus of this embodiment is omitted. The key points of the operation of this apparatus are that the three way valve 51 is switched from the second operating position shown in FIG. 22 to the first operating position shown in FIG. 21 when the preliminary catalyst temperature reaches the predetermined value, and that the adsorption catalyst 40 is heated at the downstream end exposed to the second intermediate portion 13b of the main exhaust gas passage 13 by the exhaust gas which is heated to a high temperature by the time of switching of the operating position. However, the heating of the adsorption catalyst 40 by means of the exhaust gas does not excessively increase the adsorption catalyst temperature. Therefore, there is no disadvantage that the HC which has once been adsorbed onto the adsorption catalyst 40 is desorbed from the adsorption catalyst by the increased adsorption catalyst temperature, and flows out together with the flow of the exhaust gas.

The exhaust gas purifying apparatus in accordance with this embodiment shown in FIG. 20 can be modified in various ways.

For example, the exhaust gas purifying apparatus shown in FIG. 20 can be modified. as with the case of the modifications of the first to third embodiments. That is to say, this apparatus can be applied to a machine other than the vehicle. The exhaust route selecting means 50 may be configured by a pneumatic or hydraulic control valve. The exhaust route selecting means can be controlled manually. Also, in place of the preliminary catalyst temperature, the exhaust gas temperature near the preliminary catalyst, for example, just on the downstream side of the front catalyst may be detected.

Although the exhaust route has been changed over by the three way valve 51 when the preliminary catalyst temperature has reached a predetermined value in the above fourth embodiment, the exhaust route changeover timing can be set variously. For example, the exhaust route may be changed over as with the case of the three modifications (FIGS. 10, 11, and 13) associated with the second embodiment. Specifically, the exhaust route may be changed over in accordance with the engine cooling water temperature, or may be changed over when a predetermined time, which is specified in accordance with the engine cooling water temperature at the engine start, has elapsed, or may be changed over when a predetermined time usually required for the completion of the warming up of the engine 10 has elapsed from the engine start.

Figure 23:
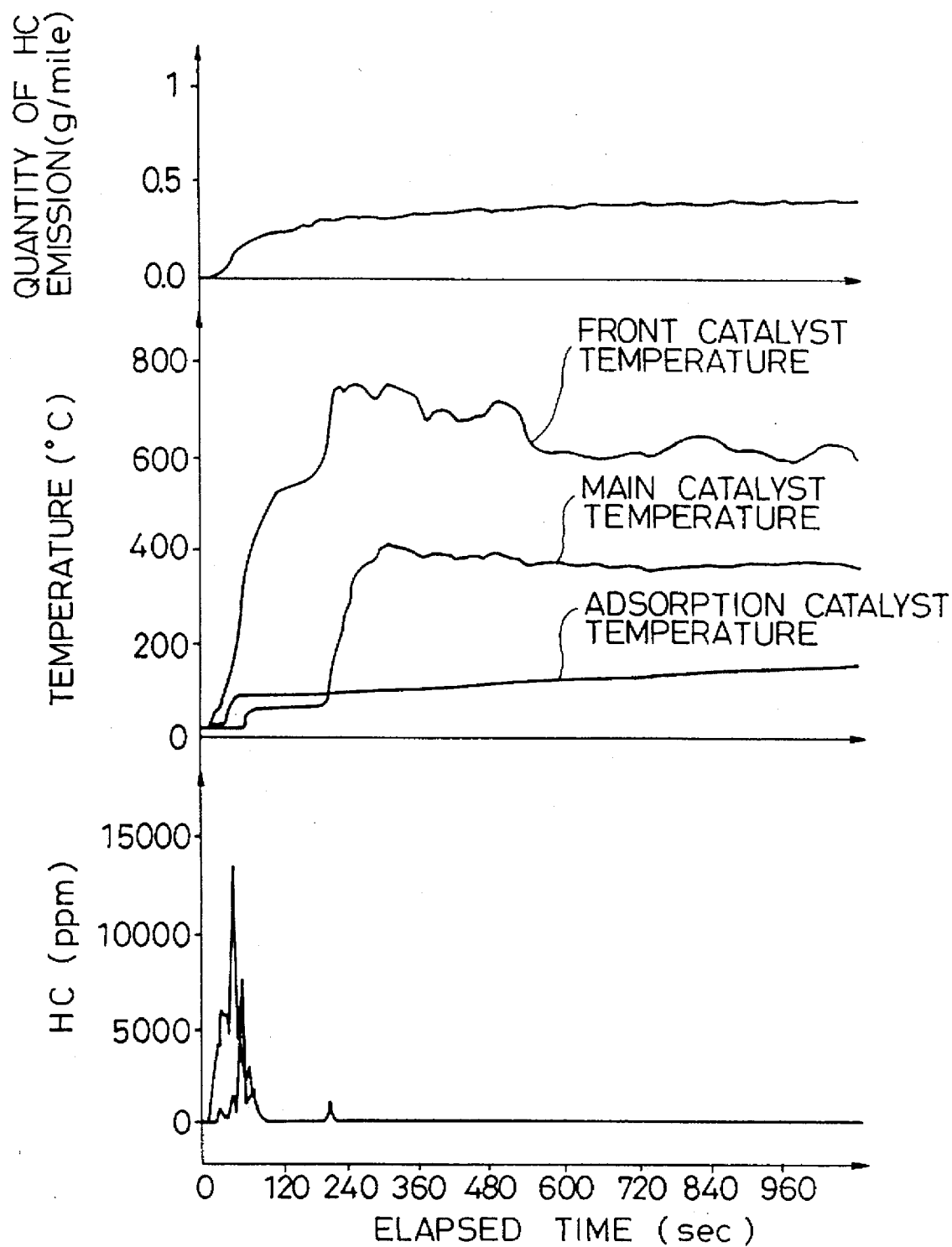
FIG. 23 is a graph showing, by way of example, the result of a cold cycle test for a vehicle on which the exhaust gas purifying apparatus according to the modification shown in FIG. 13 is mounted.
Figure 24:
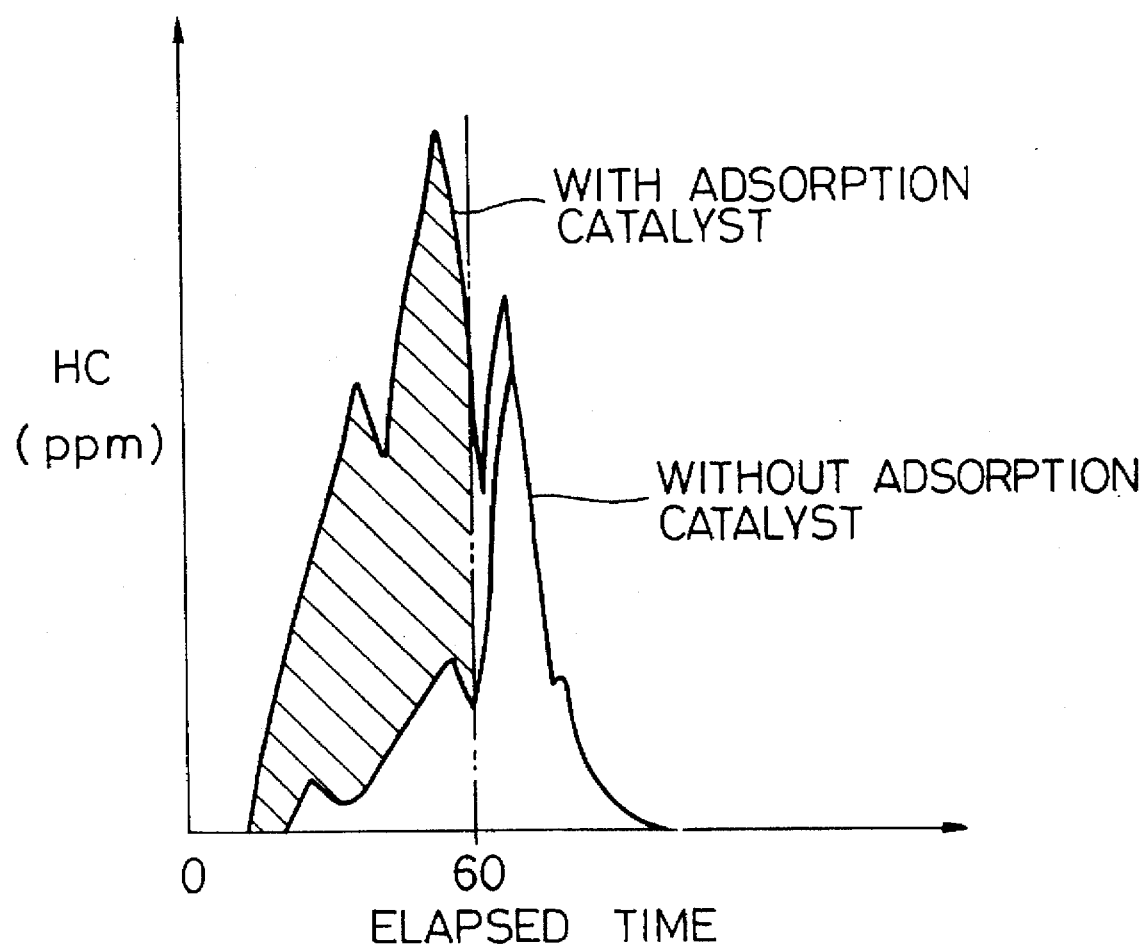
FIG. 24 is an enlarged graph showing the elapsed time— HC content relation shown in FIG. 23.

FIG. 23 typically shows the result of a cold cycle test for a vehicle mounted with the exhaust gas purifying apparatus of the modification in which the exhaust route is changed over when a predetermined time required for the completion of the warming up of the engine has elapsed. In the figure, the abscissae represent the elapsed time (second) after the engine start, and the ordinates the quantity of HC emission (gram/mile), the temperature (°C.), and the HC content (ppm). In the apparatus of this modification, before the exhaust route is changed over at the time when the predetermined time, 60 seconds, has elapsed from the engine start, the HC of the quantity indicated by the hatched area in FIG. 24 is adsorbed onto the adsorption catalyst 40, whereby the HC content in the exhaust gas immediately after the engine start can significantly be reduced as compared with the case where the adsorption catalyst 40 is not disposed. If the exhaust route changeover timing is delayed, the adsorption catalyst temperature increases excessively, thereby decreasing the HC absorbing function of the adsorption catalyst 40.

Next, modifications of the fourth embodiment in relation to the points other than the exhaust route changeover timing will be described.

Although the preliminary catalyst 21 has been arranged on the upstream side of the main catalyst 20 and the adsorption catalyst 40 in the fourth embodiment as shown in FIG. 20, the preliminary catalyst is not indispensable. Also, although the adsorption catalyst has been disposed in such a manner the adsorption catalyst 40 adjoins the main catalyst 20 and the downstream end thereof is exposed to the main exhaust gas passage 13, the adsorption catalyst may be disposed in such a manner that at least one end of the adsorption catalyst is exposed to the main exhaust gas passage. Further, although the three way valve 51, being the main element of the exhaust route selecting means 50, has been disposed at the upstream end 31 of the bypass exhaust gas passage 30 to selectively check the communication between the bypass exhaust gas passage and the main exhaust gas passage at the upstream end of the bypass exhaust passage, the three way valve 51 may be disposed at the downstream end 32 of the bypass exhaust gas passage.

Figure 25:
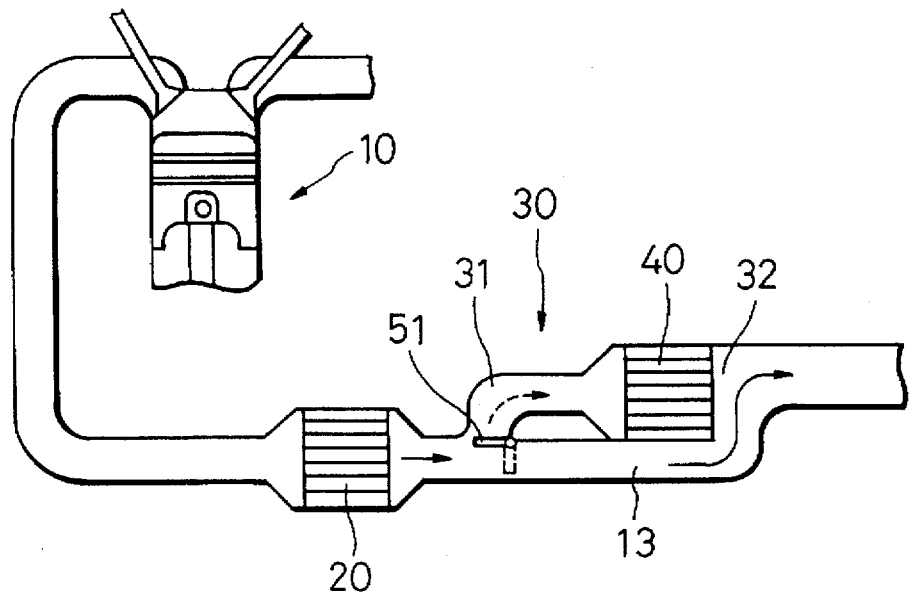
FIG. 25 is a fragmentary schematic view showing a modification of the arrangement of a main catalyst and an adsorption catalyst.

For example, in a modification shown in FIG. 25, the preliminary catalyst is not provided, and the adsorption catalyst 40 is housed in the bypass exhaust gas passage 30 branched from the main exhaust gas passage 30 on the downstream side of the main catalyst 20, the downstream end thereof being exposed to the main exhaust gas passage 13. The three way valve 51 is disposed at the upstream end 31 of the bypass exhaust gas passage 30 on the downstream side of the main catalyst 20. At the engine start, when the three way valve 51 takes the second operating position indicated by the broken line in FIG. 25, the exhaust gas from the engine 10 flows into the bypass exhaust gas passage 30 through the upstream portion of the main exhaust gas passage 13 which houses the main catalyst 20, so that the HC in the exhaust gas is adsorbed onto the adsorption catalyst housed in the bypass exhaust gas passage 30. Thereafter, when the three way valve 51 takes the first operating position indicated by the solid line in FIG. 25, the adsorption catalyst 40, whose downstream end is exposed to the main exhaust gas passage 13, is heated by the exhaust gas flowing in the main exhaust gas passage 13. As a result, the adsorbed HC is oxidized and purified at the adsorption catalyst 40.

Figure 26:
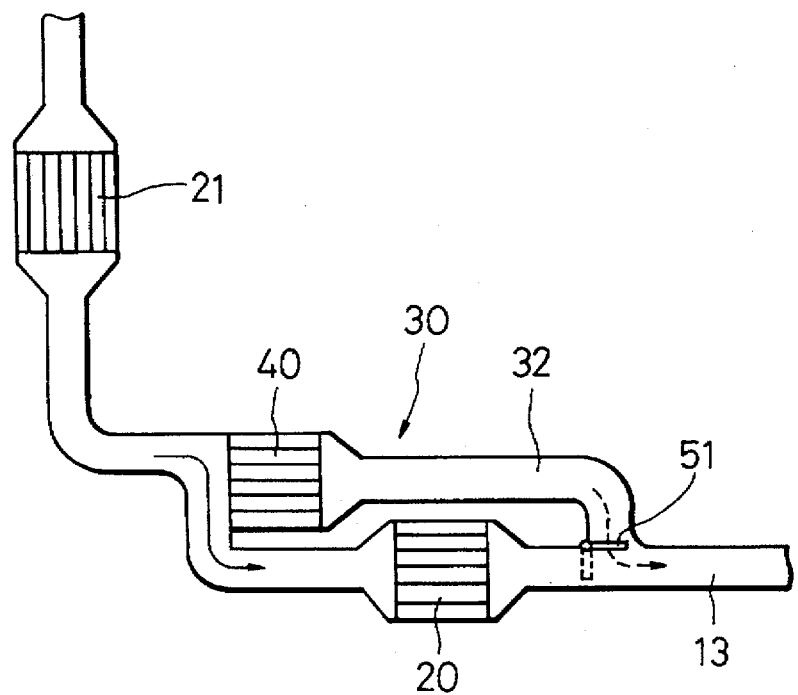
FIG. 26 is a fragmentary schematic view showing another modification of the arrangement of a main catalyst and an adsorption catalyst.

In another modification shown in FIG. 26, the exhaust route is changed over by the three way valve 51 disposed at the downstream end of the bypass exhaust gas passage 30, and the adsorption catalyst 40 is arranged so that its upstream end is exposed to the main exhaust gas passage 13. At the engine start, when the three way valve 51 takes the second operating position indicated by the broken line in FIG. 26, the exhaust gas passing through the preliminary catalyst 21 flows into the bypass exhaust gas passage 30, so that the HC in the exhaust gas is adsorbed onto the adsorption catalyst 40. Thereafter, when the three way valve 51 takes the first operating position indicated by the solid line in FIG. 26, further flow of exhaust gas into the bypass exhaust gas passage 30 is inhibited. In this case, the adsorption catalyst 40, whose upstream end is exposed to the main exhaust gas passage 13, is heated by the exhaust gas passing through the preliminary catalyst 21, so that the self-oxidation function of the adsorption catalyst 40 is performed. The resultant harmless gas such as carbon dioxide, joining the exhaust gas flowing in the main exhaust gas passage 13, flows into the main catalyst 20, and is discharged to the outside of apparatus together with the purified exhaust gas.

Figure 27:
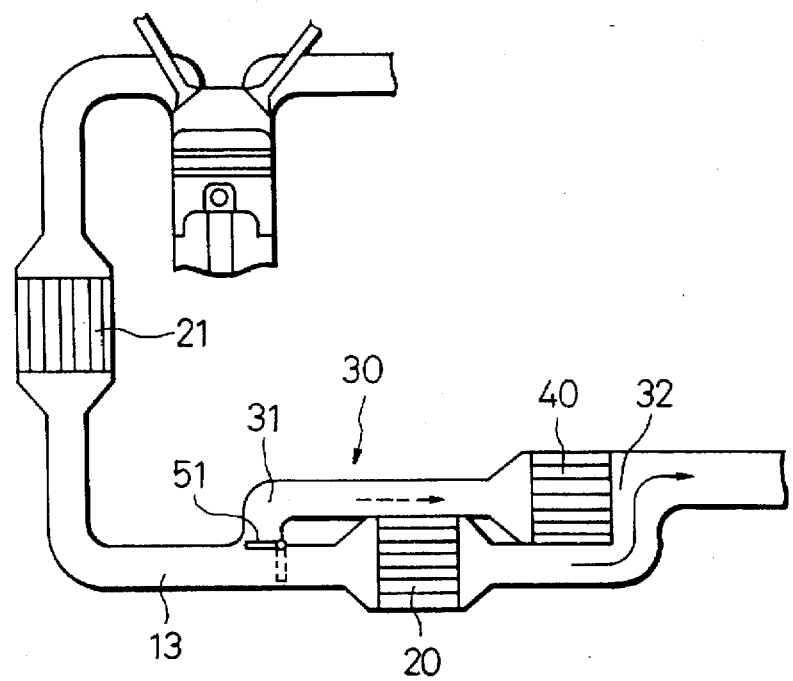
FIG. 27 is a fragmentary schematic view showing still another modification of the arrangement of a main catalyst and an adsorption catalyst.

FIG. 27 shows still another modification. In this modification, the three way valve 51 is disposed at the upstream end 31 of the bypass exhaust gas passage 30, and the adsorption catalyst 40 is arranged so that its downstream end is exposed to the main exhaust gas passage 13.

Figure 28:
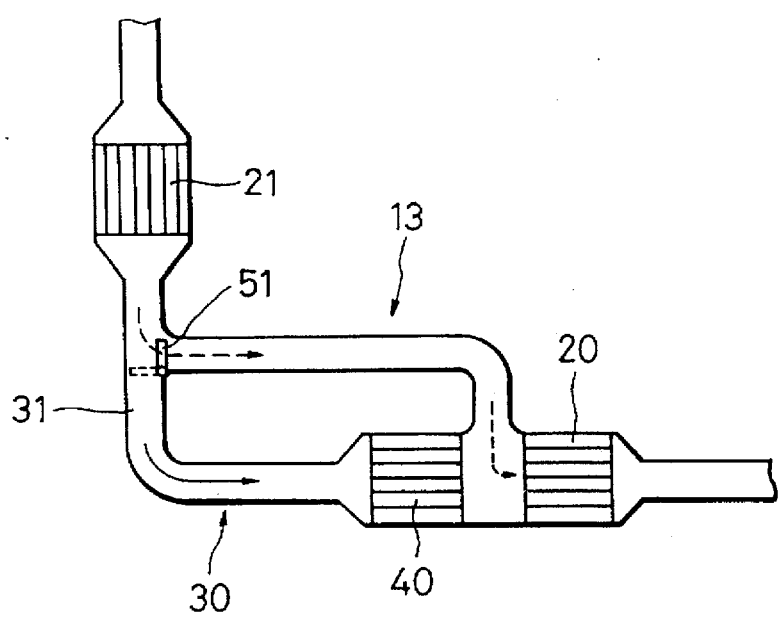
FIG. 28 is a fragmentary schematic view showing still another modification of the arrangement of a main catalyst and an adsorption catalyst.

In the modification shown in FIG. 28, the three way valve 51 is disposed at the upstream end 31 of the bypass exhaust gas passage 30, and the adsorption catalyst 40 is arranged so that its downstream end is exposed to the main exhaust gas passage 13 as in the modification shown in FIG. 27. However, the modification shown in FIG. 28 differs from that shown in FIG. 27 in that the adsorption catalyst 40 and the main catalyst 20 are arranged in series on the same axis.

Further, the apparatus of the fourth embodiment can be modified as shown in FIGS. 18 and 19. In this modification, the upstream end of the adsorption catalyst 40 arranged in the bypass exhaust gas passage 30 is exposed to the tube 13c of the main exhaust gas passage. Therefore, when the three way valve 51 takes the first operating position and the communication between the bypass exhaust gas passage 30 and the main exhaust gas passage 13 is interrupted, the adsorption catalyst 40 is heated by the exhaust gas which has just passed through the main catalyst 20.

Next, an exhaust gas purifying apparatus in accordance with a fifth embodiment of the present invention will be described below.

The apparatus of this embodiment is common to the apparatus (FIG. 1) of the above first embodiment in that the three way valve is switched between the first and second operating positions to select the exhaust route. However, this embodiment differs from the first embodiment, in which the exhaust route is selected and the heater 60, as the adsorption catalyst heating means, is simply turned on in accordance with the temperature of the three way catalyst, which is the main catalyst, in that the exhaust route is selected and the heater 60 is turned on/off in accordance with the temperature of engine cooling water, which is the parameter value relating to the engine temperature. In the meantime, the exhaust route selection timing is the same as that in the modification (FIG. 10) associated with the second embodiment.

Figure 29:
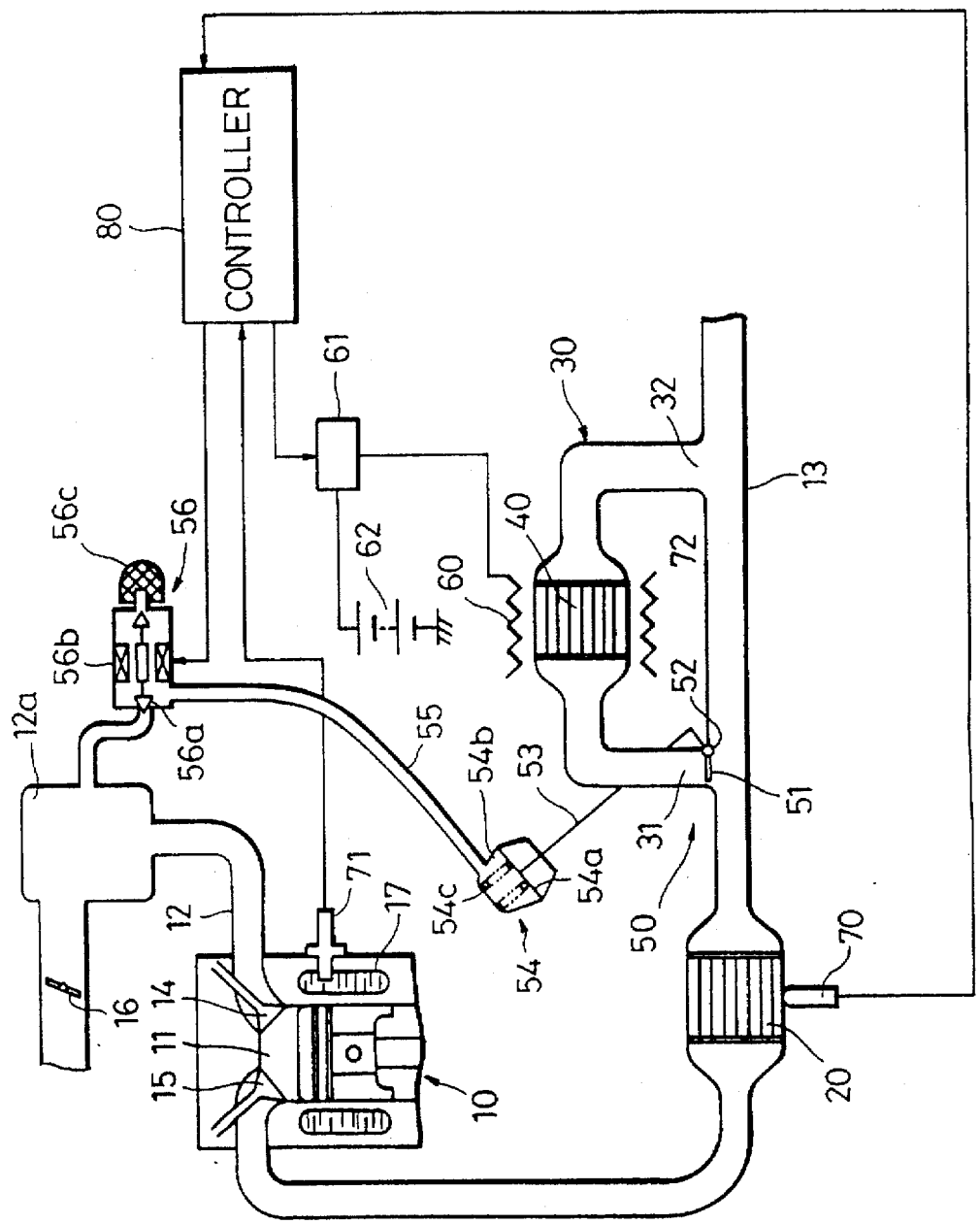
FIG. 29 is a schematic view showing an exhaust gas purifying apparatus according to a fifth embodiment of the present invention, together with peripheral elements thereof.

As shown in FIG. 29, the exhaust gas purifying apparatus of this embodiment is configured in substantially the same manner as the apparatus shown in FIG. 1; therefore, the description of the configuration common to FIGS. 1 and 29 is omitted.

Referring to FIG. 29, the exhaust gas purifying apparatus is provided with a temperature sensor for detecting the temperature of engine cooling water and produces an output representing the temperature of engine cooling water. The sensor 71 is mounted to the engine 10 so that its temperature detecting portion is arranged in an engine cooling water passage formed in the cylinder peripheral wall of the engine 10.

The exhaust gas purifying apparatus shown in FIG. 29 operates basically in the same manner as the apparatus shown in FIG. 1.

The operation of this exhaust gas purifying apparatus will be described briefly.

Figure 30:
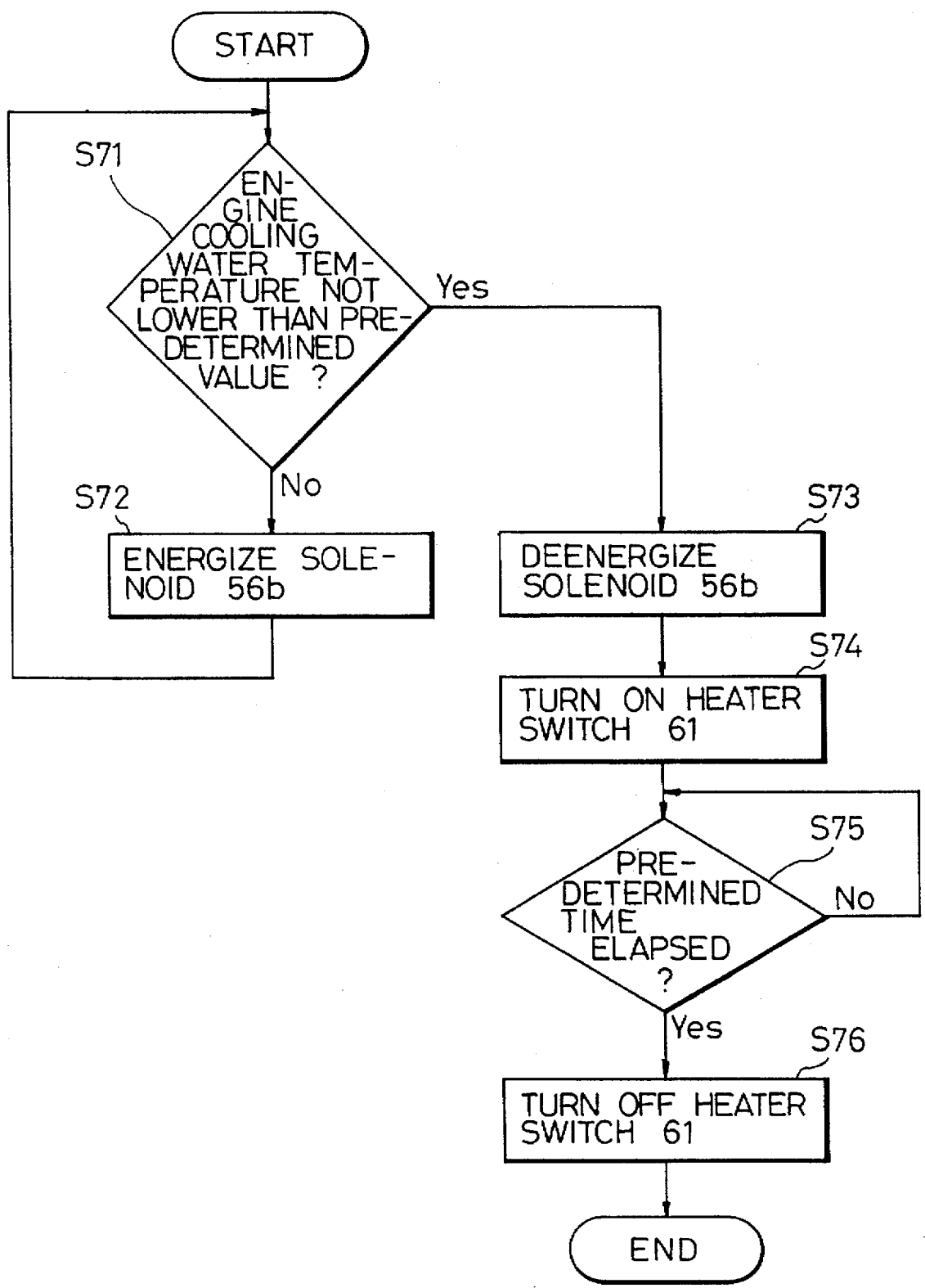
FIG. 30 is a flowchart showing an exhaust route selecting and adsorption catalyst heating routine performed by a controller shown in FIG. 29.

When the engine 10 is started, the processor of the controller 80 executes the exhaust route selecting and adsorption catalyst heating routine shown in FIG. 30 corresponding to FIGS. 6 and 10.

Specifically, if it is judged in Step S71 that the temperature of engine cooling water, which is detected by the temperature sensor 71, is lower than a predetermined value (e.g., about 40° C.), the processor energizes the solenoid 56b of the solenoid valve 56 (Step S2). As a result, the solenoid valve 56 is opened, and negative pressure is admitted into the pressure chamber 54b of the negative pressure responsive valve 54, so that the diaphragm 54a of the valve 54 is moved back. With this movement of the diaphragm, the three way valve 51 takes the second operating position (FIG. 5) for allowing the communication between the bypass exhaust gas passage 30 and the main exhaust gas passage 13. As a result, exhaust gas flows into the bypass exhaust gas passage 30. The HC contained in the exhaust gas after passing through the non-activated three way catalyst 20 is adsorbed onto the adsorption catalyst 40 arranged in the bypass exhaust gas passage 30.

Afterwards, if it is judged in Step S71 that the temperature of engine cooling water reaches the predetermined value, the processor deenergizes the solenoid 56b (Step S73), thereby closing the solenoid valve 56b. Therefore, the admission of negative pressure into the pressure chamber 54b of the negative pressure responsive valve 54 is interrupted, so that the diaphragm 54a is moved forward. Thereupon, the three way valve 51 takes the first operating position (FIG. 4) for checking the communication between the bypass exhaust gas passage 30 and the main exhaust gas passage 13.

As a result, further flow of the exhaust gas into the bypass exhaust gas passage 30 is inhibited. Although the temperature of exhaust gas increases with the completion of the warming up of the engine 10, the adsorption catalyst 40 is not exposed to new exhaust gas of high temperature. Therefore, there is no disadvantage that the HC which has once been adsorbed onto the adsorption catalyst 40 is desorbed from the adsorption catalyst by the increased temperature of the adsorption catalyst, and flows out together with the flow of the exhaust gas.

In Step 74 following Step S73, the processor sends a control output of, for example, high level to the electromagnetic relay of the heater switch 61 to close the normally open type switch contacts of the heater switch 61. In the next Step S75, the processor determines whether a predetermined adsorption catalyst heating time, which has been set in advance and stored in the memory of the controller 80, has elapsed from the turn-on time of the heater switch 61. For this purpose, for example, the processor sets the timer (not shown) incorporated in the controller 80 for the predetermined adsorption catalyst heating time, starts the timer, and refers to this timer each time it performs the determination in Step S75. If the result of the determination in Step S75 is No, the processor waits until the predetermined time elapses.

When the switch contacts of the heater switch 61 are closed, electric power is supplied from the battery 62 to the heater 60 via the heater switch 61, so that the adsorption catalyst 40 is heated by the heater 60. Afterwards, when the adsorption catalyst temperature reaches a predetermined value, e.g., about 120° C., the self-oxidation function of the adsorption catalyst 40 is performed.

If it is judged in Step S75 that the predetermined adsorption catalyst heating time has elapsed, the processor sends a control output of, for example, low level to the electromagnetic relay of the heater switch 60 to open the switch contacts of the heater switch 61 (Step S76). As a result, the heating of the adsorption catalyst performed by the heater 60 is stopped, ending the exhaust route selecting and adsorption catalyst heating routine in FIG. 30.

An exhaust gas purifying apparatus in accordance with a sixth embodiment of the present invention will be described below.

The apparatus of this embodiment is common to the apparatus of the above fifth embodiment in that the heater is on/off controlled. However, it differs from the apparatus of the fifth embodiment, in which the exhaust route is selected depending on whether the temperature of engine cooling water reaches the predetermined value, in that the exhaust route is selected depending on whether a predetermined time, which is set in accordance with the temperature of engine cooling water at the engine start, has elapsed from the engine start. The timing for selecting the exhaust route is the same as that of the modification (FIG. 11) of the second embodiment.

The operation of the exhaust gas purifying apparatus of this embodiment will briefly be described below.

Figure 12:
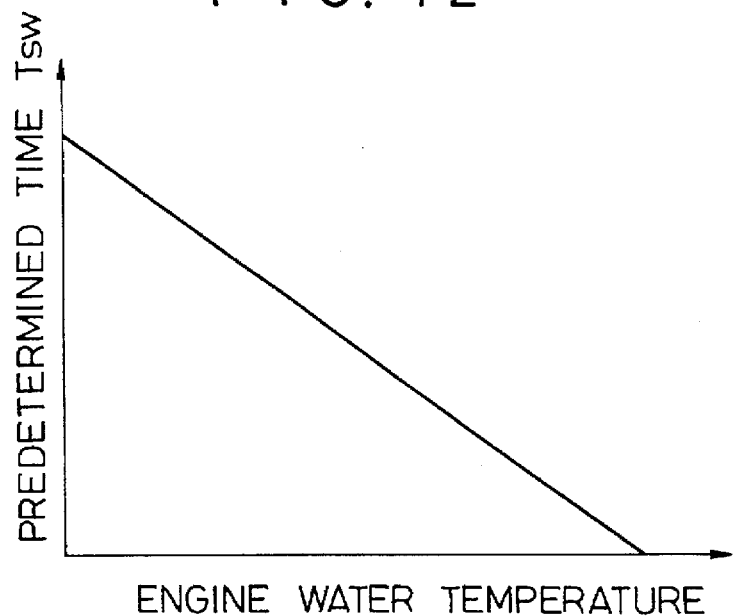
FIG. 12 is a graph showing, by way of example, a map used for the determination of a predetermined time $T_{SW}$ in the exhaust route selecting routine shown in FIG. 11.
Figure 31:
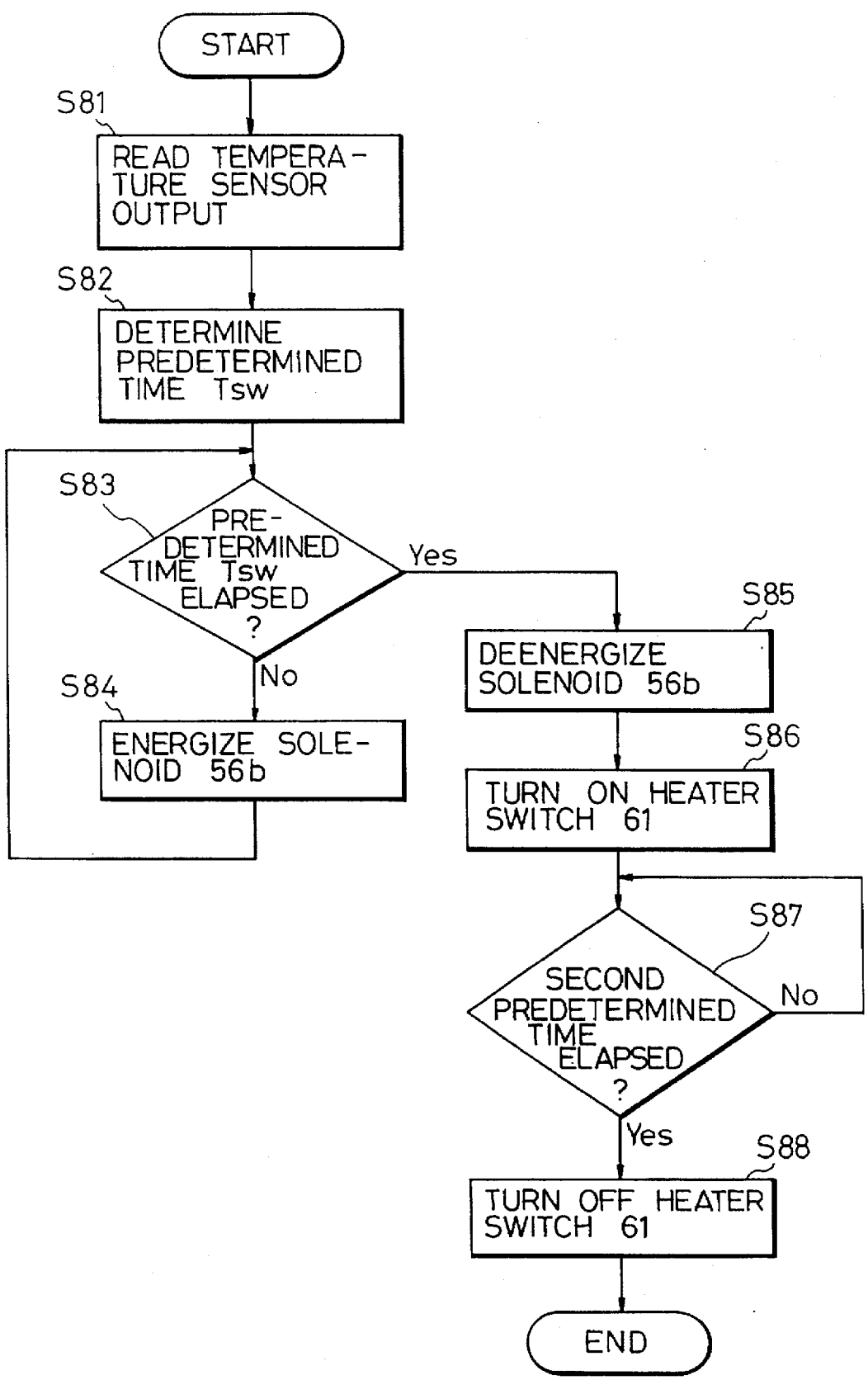
FIG. 31 is a flowchart showing an exhaust route selecting and adsorption catalyst heating routine performed by a controller of an exhaust gas purifying apparatus according to a sixth embodiment of the present invention.

As shown in FIG. 31, in the exhaust route selecting and adsorption catalyst heating routine, the processor first reads the output of the temperature sensor 71 representing the detected engine cooling water temperature (Step S81), and then determines the predetermined time $T_{SW}$ in accordance with the detected engine cooling water temperature by referring to a map exemplarily shown in FIG. 12 (Step S82). If it is judged in Step S83 that the predetermined time $T_{SW}$ has not elapsed from the engine start, the processor energizes the solenoid 56b. As a result, the three way valve 51 takes the second operating position shown in FIG. 5, so that exhaust gas flows into the bypass exhaust gas passage 30, whereby the HC in the exhaust gas is adsorbed onto the adsorption catalyst 40 in the bypass exhaust gas passage 30.

Thereafter, if it is judged in Step S83 that the predetermined time $T_{SW}$ has elapsed from the engine start, the processor executes Steps S85 to S88 corresponding to Steps S73 to S76 in FIG. 30, respectively, in succession. Specifically, if the predetermined time $T_{SW}$ has elapsed, the processor deenergizes the solenoid 56b (Step S85), and then turns on the heater switch 61 (Step S86). As a result, the three way valve 51 takes the first operating position shown in FIGS. 4 and 29, so that further flow of exhaust gas into the bypass exhaust gas passage 30 is inhibited, and exhaust gas is allowed to pass through the main exhaust gas passage 13. Also, the adsorption catalyst 40 is heated by the heater 60. The adsorbed HC is oxidized and purified at the adsorption catalyst 40. If a second predetermined time (predetermined adsorption catalyst heating time) has elapsed from the adsorption catalyst heating start time, the heating of the adsorption catalyst 40 performed by the heater 60 under the control of the processor is stopped, ending the exhaust route selecting and adsorption catalyst heating routine in FIG. 31.

The exhaust gas purifying apparatus in accordance with the above fifth and sixth embodiments can be modified in various ways.

For example, with the apparatus shown in FIG. 29, which is configured so that both ends of the bypass exhaust gas passage connect to the main exhaust gas passage, the three way valve 51 may be disposed at the downstream end 32 of the bypass exhaust gas passage or may be disposed at both of the upstream and downstream ends thereof, as with the case of the modification of the first embodiment. The bypass exhaust gas passage 30 may be configured so as to connect to the main exhaust gas passage 13 at the upstream end only. The exhaust route selecting means 50 may be configured by a pneumatic or hydraulic control valve. Further, the adsorption catalyst 40 and the heating means may be installed integrally.

In the above fifth embodiment, following the interruption of the communication between the bypass exhaust gas passage 30 and the main exhaust gas passage 13 in Step S73 in FIG. 30, the adsorption catalyst 40 is heated by the heater 60 for a certain predetermined adsorption catalyst heating time. However, the predetermined adsorption catalyst heating time may be variably set in accordance with the engine cooling water temperature detected at the engine start. Alternatively, the heater 60 can be on/off controlled so that the adsorption catalyst temperature is kept within a predetermined temperature range. Further, it is not indispensable to start heating of the adsorption catalyst 40 simultaneously with the interruption of the communication between the bypass exhaust gas passage and the main exhaust gas passage. The heating of the adsorption catalyst may be started prior to the interruption of the exhaust passage communication, provided that the timing is such that the adsorption catalyst temperature at which the desorption of the absorbed HC advances is not reached. For example, a third predetermined time from the engine start to the start of the ON operation of the heater switch 61 is determined so as to be shorter than the predetermined time $T_{SW}$ and to be a value corresponding to the engine cooling water temperature detected at the engine start, and the heater switch 61 may be operated ON over the second predetermined time (predetermined adsorption catalyst heating time) after it is judged that the third predetermined time has elapsed.

Although the exhaust route has been selected in accordance with the temperature of engine cooling water in the above fifth embodiment, the engine oil temperature, the suction air temperature, or other parameter values relating to the engine temperature may be used in place of the engine cooling water temperature.

Next, an exhaust gas purifying apparatus in accordance with a seventh embodiment of the present invention will be described.

The apparatus of this embodiment is common to the apparatus (FIG. 29) of the above fifth embodiment in that the exhaust route is selected by switching the three way valve between the first and second operating positions and the heater 60, as the adsorption catalyst heating means, is on/off controlled. However, this apparatus differs from the apparatus of the fifth embodiment, in which the exhaust route is selected in accordance with the temperature of engine cooling water, in that the exhaust route is selected in accordance with the adsorption catalyst temperature.

Figure 32:
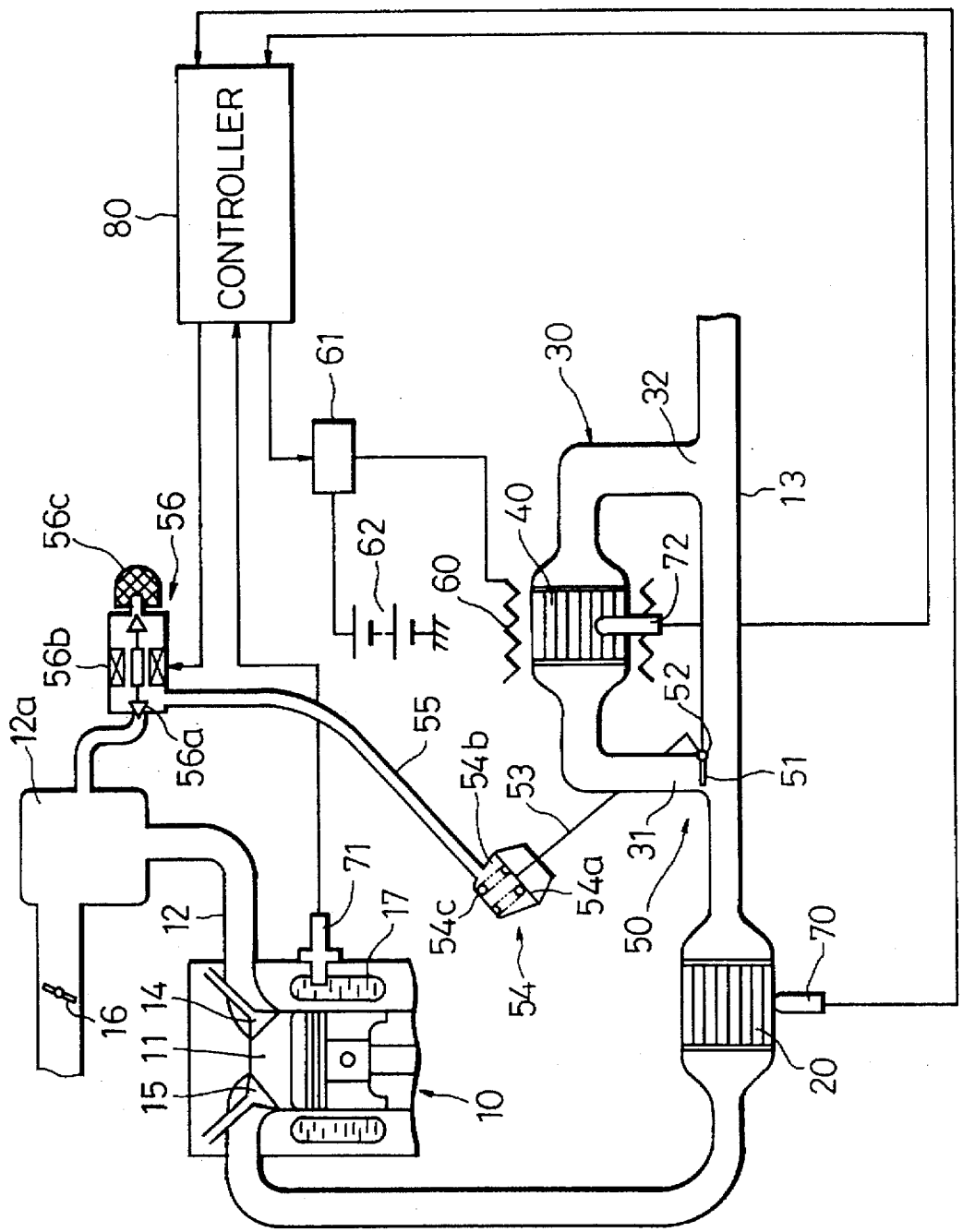
FIG. 32 is a schematic view showing an exhaust gas purifying apparatus according to a seventh embodiment of the present invention, together with peripheral elements thereof.

As shown in FIG. 32, the exhaust gas purifying apparatus of this embodiment is configured in substantially the same manner as the apparatus shown in FIG. 29; therefore, the description of the configuration common to FIGS. 29 and 32 is omitted.

Referring to FIG. 32, the exhaust gas purifying apparatus is provided with an adsorption catalyst temperature sensor 72 for detecting the adsorption catalyst temperature and producing an output representing the detected adsorption catalyst temperature. This sensor 72 is disposed so that the temperature detecting portion thereof abuts on or is inserted into the adsorption catalyst 40 and the base thereof penetrates the heater 60, extending toward the outside.

The exhaust gas purifying apparatus shown in FIG. 32 operates basically in the same manner as the apparatus shown in FIG. 29.

The operation of this exhaust gas purifying apparatus will be described briefly.

Figure 33:
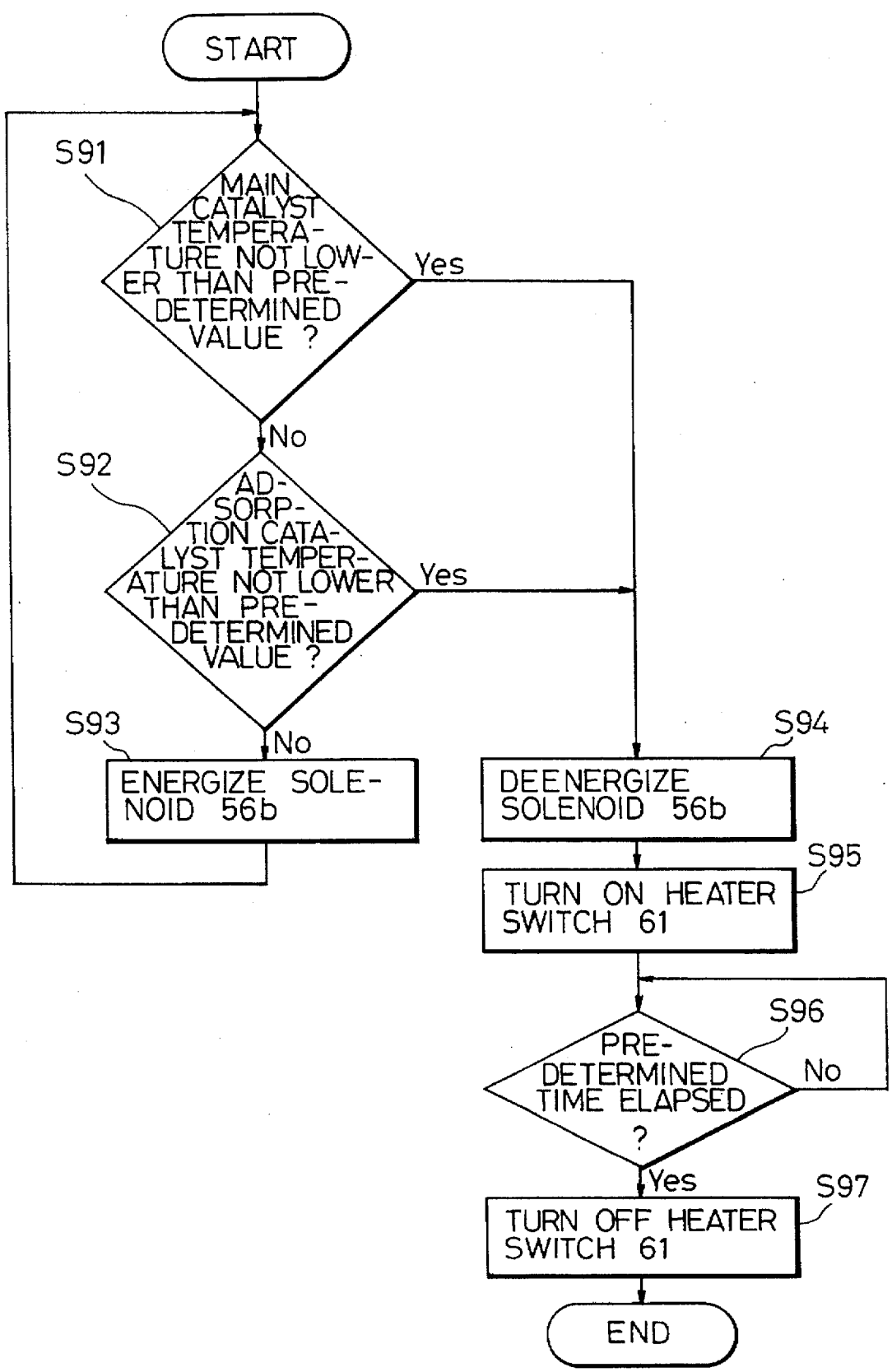
FIG. 33 is a flowchart showing an exhaust route selecting and adsorption catalyst heating routine performed by a controller shown in FIG. 32.

When the engine 10 is started, the processor of the controller 80 executes the exhaust route selecting and adsorption catalyst heating routine shown in FIG. 33 corresponding to FIG. 30.

Specifically, if it is judged in Step S91 that the main catalyst temperature detected by the temperature sensor 70 is lower than a predetermined value representing the completion of activation of the three way catalyst 20, e.g., 350° C., the processor determines, on the basis of the output of the temperature sensor 72 representing the adsorption catalyst temperature, whether the detected adsorption catalyst temperature is not lower than a predetermined temperature at which the HC absorption performance of the adsorption catalyst 40 starts to decrease, e.g., about 100° C. (Step S92). If both of the determination results in Steps S91 and S92 are No, the processor energizes the solenoid valve 56 (Step S93). As a result, the solenoid valve 56 is opened, and negative pressure is admitted into the pressure chamber 54b of the negative pressure responsive valve 54, so that the diaphragm 54a is moved back. With this movement of the diaphragm, the three way valve 51 takes the second operating position (FIG. 5) for allowing the communication between the bypass exhaust gas passage 30 and the main exhaust gas passage 13. As a result, exhaust gas flows into the bypass exhaust gas passage 30. The HC contained in the exhaust gas after passing through the non-activated three way catalyst 20 is adsorbed onto the adsorption catalyst 40 arranged in the bypass exhaust gas passage 30.

Afterwards, if it is judged in Step S91 that the main catalyst temperature reaches the predetermined value, the processor deenergizes the solenoid 56b (Step S94), so that the solenoid valve 56 is closed. Therefore, the admission of negative pressure into the pressure chamber 54b of the negative pressure responsive valve 54 is interrupted, so that the diaphragm 54a is moved forward. Thereupon, the three way valve 51 takes the first operating position (FIG. 4) for checking the communication between the bypass exhaust gas passage 30 and the main exhaust gas passage 13. As a result, further flow of the exhaust gas into the bypass exhaust gas passage 30 is inhibited. Meanwhile, the exhaust gas is discharged to the atmosphere through the main exhaust gas passage 13.

If the determination result in Step S91 is No, and the determination result in Step S92 is Yes, and therefore if it is judged that the adsorption catalyst temperature is not lower than the predetermined value before the activation of the three way catalyst 20 is completed, the processor deenergizes the solenoid 56b (Step S94) as with the case where the activation of the three way catalyst 20 is completed, thereby changing the exhaust route. That is to say, when the adsorption catalyst temperature reaches the predetermined value, e.g., about 100° C., the exhaust route is changed over before the completion of activation of the three way catalyst 20. As a result, even in the case where a type of adsorption catalyst 40 is used such that the adsorbed HC is desorbed in preference to the oxidation of the adsorbed HC when a considerable amount of exhaust gas passes through the adsorption catalyst 40 at a temperature near the lower limit (e.g., about 120° C.) of the oxidation temperature range, or the HC adsorbing performance decreases when the adsorption catalyst temperature reaches a considerably high value (e.g., about 100° C.), the exhaust route is changed over as soon as the adsorption temperature enters the HC desorbing temperature range or the absorbing performance deteriorating temperature range. Therefore, the adsorption of HC and the decrease in adsorbing performance are surely prevented.

Following Step S94, the processor executes Steps S95 to S97 corresponding to Steps S74 to S76 in FIG. 30, respectively, in succession. Specifically, the normally open type switch contacts of the heater switch 61 are closed (Step S95), and the processor determines whether the predetermined adsorption catalyst heating time has elapsed from the ON operation start time of the heater switch 61 (Step S96).

When the switch contacts of the heater switch 61 are closed, the adsorption catalyst 40 is heated by the heater 60. Afterwards, when the adsorption catalyst temperature reaches a predetermined value, e.g., about 120° C., the self-oxidation function of the adsorption catalyst 40 is performed, and the HC adsorbed onto the adsorption catalyst 40 is oxidized by the oxygen which is present around the adsorption catalyst 40 to form harmless carbon dioxide, water, etc. The gas containing carbon dioxide etc. is discharged to the outside of the apparatus together with the flow of the exhaust gas flowing in the main exhaust gas passage 13.

If it is judged in Step S96 that the predetermined adsorption catalyst heating time has elapsed, the switch contacts of the heater switch 61 are opened (Step S97), so that the heating of the adsorption catalyst 40 performed by the heater 60 is stopped.

The exhaust gas purifying apparatus of this embodiment can be modified in various ways.

For example, with the apparatus shown in FIG. 32, which is configured so that both ends of the bypass exhaust gas passage connect to the main exhaust gas passage, the three way valve 51 may be disposed at the downstream end 32 of the bypass exhaust gas passage or may be disposed at both of the upstream and downstream ends thereof, as with the case of the modification of the first embodiment. The bypass exhaust gas passage 30 may be configured so as to connect to the main exhaust gas passage 13 at the upstream end only. The exhaust route selecting means 50 may be configured by a pneumatic or hydraulic control valve.

Next, the modification for the exhaust route changeover timing will be described.

In the above seventh embodiment, the exhaust route has been changed over in accordance with the main catalyst temperature and the adsorption catalyst temperature detected by the temperature sensors 70 and 72, respectively. However, only the adsorption catalyst temperature may be considered in switching the exhaust route. In this case, the main catalyst temperature determining step S91 in FIG. 33 is not required. Alternatively, in place of the exhaust route changeover in accordance with a combination of the adsorption catalyst temperature and the main catalyst temperature, the exhaust route may be changed over in accordance with a combination of the adsorption catalyst temperature and the engine cooling water temperature, which is detected by the water temperature sensor 71 as a parameter value relating to the engine temperature, or a combination of the adsorption catalyst temperature and the exhaust gas temperature near the main catalyst 20, for example, just on the downstream side of the main catalyst. In this case, whether or not the exhaust gas temperature or the engine cooling water temperature is equal to or higher than a predetermined value is determined in Step S91 in FIG. 33. In place of the engine cooling water temperature, the engine lubricating oil temperature, the suction air temperature, etc. may be used as a parameter value relating to the engine temperature.

As with the case of the modification (FIG. 11) of the second embodiment, the exhaust route may be changed over depending on whether a predetermined time, which is specified in accordance with the engine cooling water temperature at the engine start, has elapsed.

Figure 34:
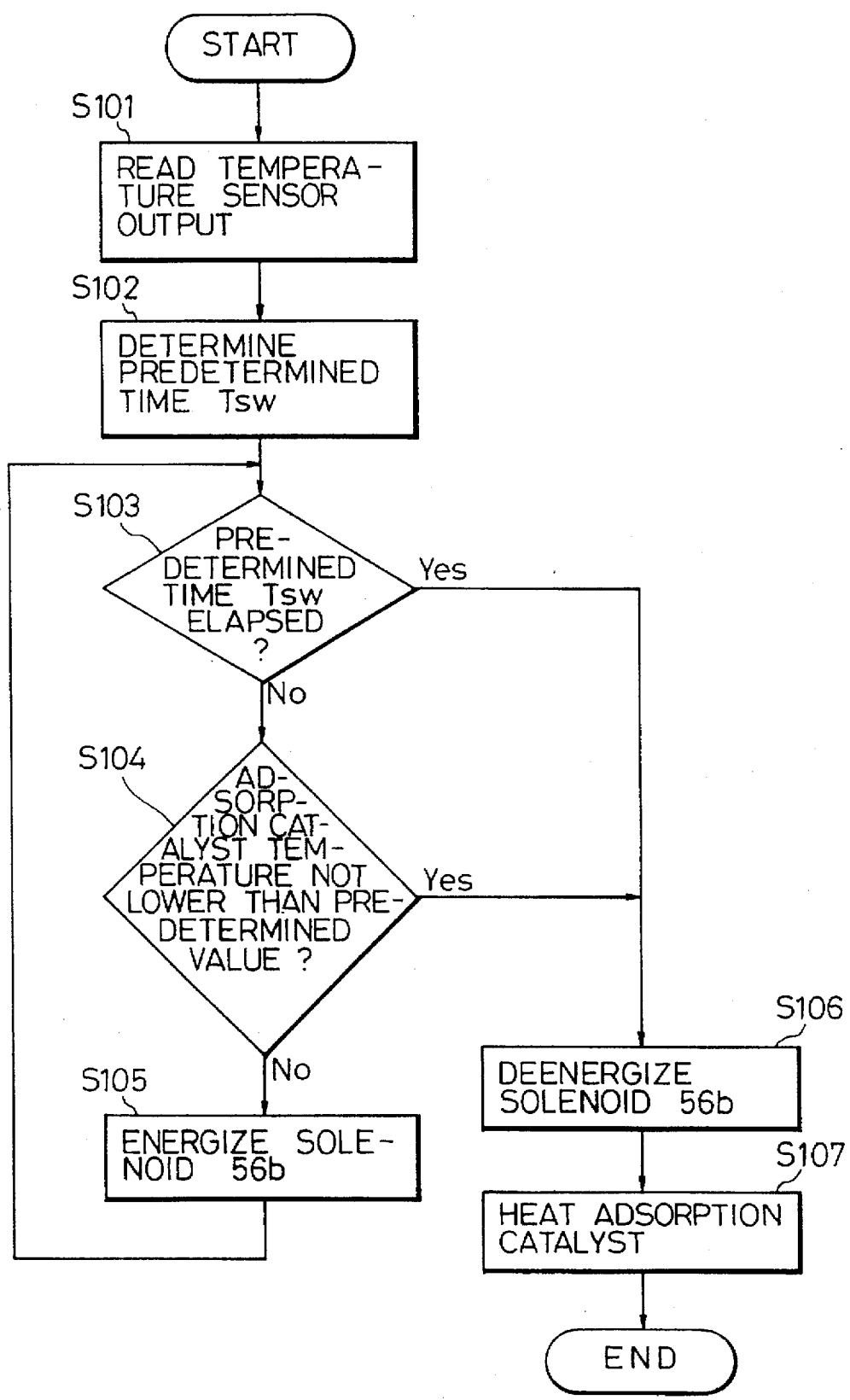
FIG. 34 is a flowchart showing an exhaust route selecting and adsorption catalyst heating routine for a modification of the seventh embodiment.

In this case, the processor of the controller 80 executes the exhaust route selecting and adsorption catalyst heating routine shown in FIG. 34. Specifically, the processor first reads the output of the temperature sensor 70 representing the detected engine cooling water temperature (Step S101), and then determines the predetermined time $T_{SW}$ in accordance with the detected engine cooling water temperature by referring to a map exemplarily shown in FIG. 12 (Step S102). Then, the processor determines whether the predetermined time $T_{SW}$ has elapsed from the engine start (Step S103). If the determination result is No, the processor further determines in Step S104, which corresponds to Step S92 in FIG. 33, whether the adsorption catalyst temperature is not lower than the predetermined value. If this determination result is also No, the processor energizes the solenoid 56b in Step S105 corresponding to Step S93 in FIG. 33. As a result, the three way valve 51 takes the second operating position shown in FIG. 5, so that exhaust gas flows into the bypass exhaust passage 30, whereby the HC in the exhaust gas is adsorbed onto the adsorption catalyst 40 in the bypass exhaust gas passage 30.

Thereafter, if it is judged in Step S103 that the predetermined time $T_{SW}$ has elapsed from the engine start, or if it is judged that the adsorption catalyst temperature is not lower than the predetermined value, the processor deenergizes the solenoid 56b in Step S106 corresponding to Step S94 in FIG. 33, and then executes the adsorption catalyst heating routine (Step S107) corresponding Steps S95 to S97 in FIG. 33. As a result, the three way valve 51 takes the first operating position shown in FIG. 4, so that further flow of exhaust gas into the bypass exhaust gas passage 30 is inhibited, and meanwhile the adsorbed HC at the adsorption catalyst 40 heated by the heater 60 is purified.

In the above modification in which the exhaust route is changed over depending on whether the predetermined time $T_{SW}$ which varies in accordance with the engine cooling water temperature at the engine start has elapsed, in place of the water temperature sensor output reading step S101 and the predetermined time $T_{SW}$ determining step S102 in FIG. 34, a step may be provided to simply determine whether a predetermined time usually required for the completion of the warming up of the engine 10 or the completion of the activation of the three way catalyst 20, e.g., about 60 seconds has elapsed from the engine start.

Next, the heating means will be described. In place of the heating means (heater 60) disposed separately from the adsorption catalyst 40, the heating means may be disposed integrally with the adsorption catalyst. Also, in place of heating the adsorption catalyst 40 by means of the heater 60 for a certain predetermined adsorption catalyst heating time, the predetermined adsorption catalyst heating time may be variably set in accordance with the engine cooling water temperature detected at the engine start, or the heater 60 may be on/off controlled so that the adsorption catalyst temperature can be kept within a predetermined range. Further, the heating of the adsorption catalyst 40 may be started before the communication between the exhaust gas passages is interrupted.

The installation of the heating means is not indispensable. Therefore, the exhaust gas purifying apparatus can be modified in various ways.

For example, as with the case of the modification (FIGS. 18 and 19), the adsorption catalyst 40 may be heated by the heat transfer from the main catalyst to the adsorption catalyst 40 or by the exhaust gas immediately after passing through the main catalyst. Also, as with the case of the above fourth embodiment (FIG. 20), the adsorption catalyst 40 may be disposed so as to adjoin the main catalyst 20 to heat the adsorption catalyst 40 by means of heat transfer and exhaust gas. As with the case of the modification (FIG. 25) of the fourth embodiment, the adsorption catalyst 40 may be heated by the exhaust gas immediately after passing through the main catalyst 20. Further, as with the case of the above second embodiment (FIG. 8), part of the exhaust gas may be used to heat the adsorption catalyst 40.

Next, an exhaust gas purifying apparatus in accordance with an eighth embodiment of the present invention will be described below.

The apparatus of this embodiment is common to the apparatus (FIG. 32) of the above sixth embodiment in that the exhaust route is selected in accordance with the adsorption catalyst temperature and the adsorption catalyst heating means (heater 60) is on/off controlled, and is characterized in that the deterioration of the adsorption catalyst due to excessive increase in adsorption catalyst temperature can be prevented.

The exhaust gas purifying apparatus of this embodiment is configured in the same manner as the apparatus shown in FIG. 32; therefore, the description of the apparatus is omitted.

Figure 35:
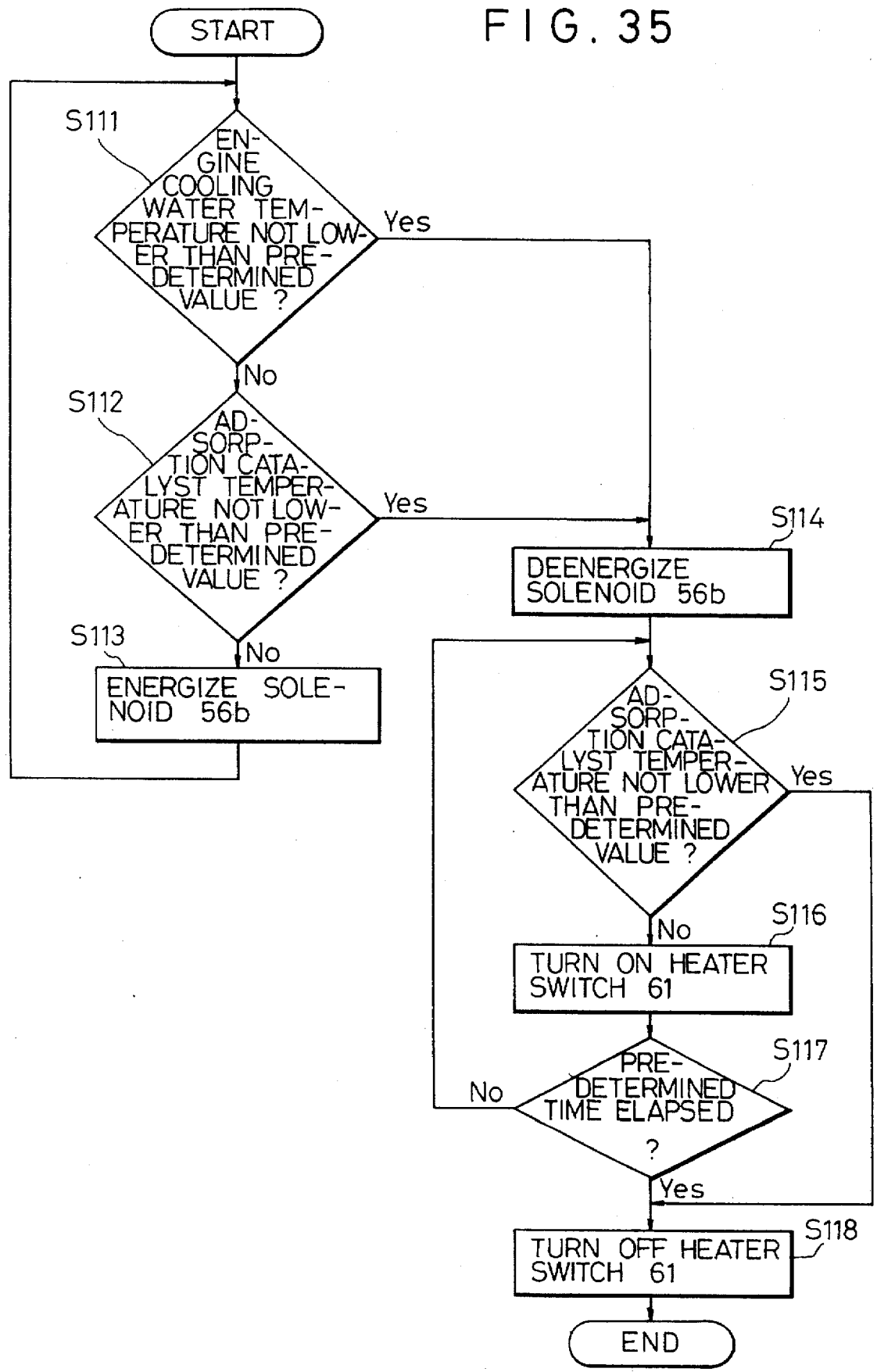
FIG. 35 is a flowchart showing an exhaust route selecting and adsorption catalyst heating routine performed by an exhaust gas purifying apparatus according to an eighth embodiment of the present invention.

In the exhaust route selecting and adsorption catalyst heating routine shown in FIG. 35, if it is judged in Step S111 that the engine cooling water temperature detected by the water temperature sensor 71 is lower than a predetermined value representing the completion of the warming up of the engine 10 and in turn the completion of the activation of the three way catalyst 20, e.g., about 40° C., the processor of the controller 80 further determines whether the adsorption catalyst temperature detected by the temperature sensor 72 is not lower than the lower limit value of the temperature range in which the adsorption catalyst 40 deteriorates, e.g., about 600° C. (Step S112). If both of the determination results in Steps S111 and S112 are No, the processor energizes the solenoid valve 56 (Step S113). As a result, the solenoid valve 56 is opened, and negative pressure is admitted into the pressure chamber 54b of the negative pressure responsive valve 54, so that the diaphragm 54a of the valve 54 is moved back. With this movement of the diaphragm, the three way valve 51 takes the second operating position (FIG. 5) for allowing the communication between the bypass exhaust gas passage 30 and the main exhaust gas passage 13. As a result, exhaust gas flows into the bypass exhaust gas passage 30. The HC contained in the exhaust gas after passing through the non-activated three way catalyst 20 is adsorbed onto the adsorption catalyst 40 arranged in the bypass exhaust gas passage 30.

Afterwards, if it is judged in Step S111 that the engine cooling water temperature reaches the predetermined value, the processor deenergizes the solenoid 56b (Step S114), so that the solenoid valve 56 is closed. Therefore, the admission of negative pressure into the pressure chamber 54b of the negative pressure responsive valve 54 is interrupted, so that the diaphragm 54a is moved forward, whereby the three way valve 51 takes the first operating position (FIG. 4) for checking the communication between the bypass exhaust gas passage 30 and the main exhaust gas passage 13. As a result, further flow of the exhaust gas into the bypass exhaust gas passage 30 is inhibited. Meanwhile, the exhaust gas is discharged to the atmosphere through the main exhaust gas passage 13.

In Step S115 following Step S114, the processor determines whether the adsorption catalyst temperature is not lower than the lower limit of the adsorption catalyst deteriorating temperature range, e.g., about 600° C. as with the case of the above Step S112. Normally, this determination result is No. Therefore, the processor closes the normally open type switch contacts of the heater switch 61 (Step S116), so that the heating of the adsorption catalyst 40 by means of the heater 60 is started.

During the time when the adsorption catalyst 40 is heated by the heater 60, the processor determines whether a predetermined time, which has been set in advance and stored in the memory of the controller 80, e.g., 10 minutes has elapsed form the ON operation start time of the heater switch 61 (Step S117). The determination result of Step S117 is No until the predetermined heating time has elapsed. Therefore, the process returns from Step S117 to the aforementioned Step S115. In other words, during the heating of the adsorption catalyst, the processor repeatedly determines whether the adsorption catalyst temperature has increased excessively to the adsorption catalyst deteriorating temperature range. Usually, the adsorption catalyst temperature does not increase excessively, and the determination result in Step S115 is No.

Thereafter, when the adsorption temperature reaches the predetermined value, e.g., about 120° C., the self-oxidation function of the adsorption catalyst 40 is performed, so that the HC adsorbed onto the adsorption catalyst turns to harmless carbon dioxide, water, etc.

If it is judged in Step S117 that the predetermined heating time has elapsed, the processor opens the switch contacts of the heater switch 61 (Step S118). As a result, the heating of the adsorption catalyst 40 by means of the heater 60 is stopped.

In the exhaust route selecting and adsorption catalyst heating routine, if the determination result in Step S111 is No, and the determination result in Step S112 is Yes, and therefore it is judged that the adsorption catalyst temperature becomes the predetermined value or higher for any reason before the warming up of the engine 10 is completed, the processor deenergizes the solenoid 56b (Step S114). Specifically, if the adsorption catalyst temperature reaches the predetermined value, e.g., about 600° C., the exhaust route is changed over before the warming up of the engine 10 is completed. Thereupon, the communication between the bypass exhaust gas passage 30 and the main exhaust gas passage 13 is inhibited, so that the adsorption catalyst 40 is not heated further by the exhaust gas flowing additionally into the bypass exhaust gas passage 30. As a result, the deterioration of the adsorption catalyst 40 due to excessive increase in adsorption catalyst temperature is surely prevented.

During the time when the adsorption catalyst 40 is heated by the heater 60, if it is judged that the adsorption catalyst temperature becomes the predetermined value. e.g., about 600° C., or higher for any reason before the predetermined heating time has elapsed, the processor opens the switch contacts of the heater switch 61 (Step S118). Specifically, when the adsorption catalyst temperature starts to increase excessively, the heating of the adsorption catalyst 40 by means of the heater 60 is forcedly stopped before the predetermined heating time has elapsed, so that the deterioration of the absorption catalyst 40 due to an excessive increase in adsorption catalyst temperature is surely prevented.

The exhaust gas purifying apparatus of this embodiment can be modified in various ways.

For example, with the apparatus of this embodiment, which is configured so that both ends of the bypass exhaust gas passage connect to the main exhaust gas passage, the three way valve 51 may be disposed at the downstream end 32 of the bypass exhaust gas passage or may be disposed at both of the upstream and downstream ends thereof, as with the case of the modification of the first embodiment. The bypass exhaust gas passage 30 may be configured so as to connect to the main exhaust gas passage 13 at the upstream end only. The exhaust route selecting means 50 may be configured by a pneumatic or hydraulic control valve.

Next, the modification of the eighth embodiment for the exhaust route changeover timing will be described.

In the above eighth embodiment, the exhaust route is changed over in accordance with the engine cooling water temperature (in a broad sense, a parameter value relating to the engine temperature) and the adsorption catalyst temperature detected by the water temperature sensor 71 and the temperature sensor 72, respectively. However, only the adsorption catalyst temperature may be considered in changing the exhaust route like the modification of the seventh embodiment. In this case, the main catalyst temperature determining step S91 in FIG. 33 is not required. In place of the engine cooling water temperature, the engine lubricating oil temperature, the suction air temperature, etc. may be used.

Depending on the type of the adsorption catalyst 40, the adsorbed HC is sometimes desorbed from the adsorption catalyst in preference to the oxidation of the adsorbed HC by the adsorption catalyst when a considerable amount of exhaust gas passes through the adsorption catalyst 40, for example, even near the lower limit temperature (about 120° C.) of the self-oxidation temperature range, and the HC adsorbing performance of the adsorption catalyst is sometimes decreased when the adsorption catalyst temperature reaches a considerably high value (e.g., about 100° C.). When an adsorption catalyst 40 of this type is used, the processor may determine in Step S92 in FIG. 33 whether the adsorption catalyst temperature is not lower than the lower limit value (about 120° or about 100° C.) of the HC desorbing temperature range or the adsorption performance deteriorating temperature range.

In place of the exhaust route changeover in accordance with a combination of the engine cooling water temperature and the adsorption catalyst temperature, the exhaust route may be changed over in accordance with a combination of the adsorption catalyst temperature and the main catalyst temperature, which is detected by the temperature sensor 70, or a combination of the adsorption catalyst temperature and the exhaust gas temperature near the main catalyst 20, for example, just on the downstream side of the main catalyst. In this case, whether the main catalyst temperature or the exhaust gas temperature is not lower than a predetermined value (for example, the value representing the completion of the activation of the main catalyst 20) is determined in Step S91 in FIG. 33.

Like the modification (FIG. 11) of the second embodiment and the modification (FIG. 34) of the seventh embodiment, the exhaust route may be selected depending on whether a predetermined time, which is specified in accordance with the engine cooling water temperature at the engine start, has elapsed from the engine start. In this case, the processor of the controller 80 executes the exhaust route selecting and adsorption catalyst heating routine shown in FIG. 36. Specifically, the processor first reads the output of the temperature sensor 70 representing the detected engine cooling water temperature (Step S121), and then determines the predetermined time $T_{SW}$ in accordance with the detected engine cooling water temperature by referring to a map exemplarily shown in FIG. 12 (Step S122). Then, if it is judged in Step S123 that the predetermined time $T_{SW}$ has not elapsed from the engine start, the processor determines in Step S124, which corresponds to Step S112 in FIG. 33, whether the adsorption catalyst temperature is not lower than the predetermined value. If this determination result is also No, the processor energizes the solenoid 56b in Step S125 corresponding to Step S113 in FIG. 33. As a result, the three way valve 51 takes the second operating position shown in FIG. 5, so that exhaust gas flows into the bypass exhaust passage 30, whereby the HC in the exhaust gas is adsorbed onto the adsorption catalyst 40 in the bypass exhaust gas passage 30.

Thereafter, if it is judged in Step S123 that the predetermined time $T_{SW}$ has elapsed from the engine start, or if it is judged that the adsorption catalyst temperature is not lower than the predetermined value, the processor deenergizes the solenoid 56b in Step S126 corresponding to Step S114 in FIG. 33, and then executes the adsorption catalyst heating routine (Step S127) corresponding to Steps S115 to S118 in FIG. 33. As a result, the three way valve 51 takes the first operating position shown in FIG. 4, so that further flow of exhaust gas into the bypass exhaust gas passage 30 is inhibited, and meanwhile the adsorbed HC at the adsorption catalyst 40 heated by the heater 60 is purified.

Figure 36:
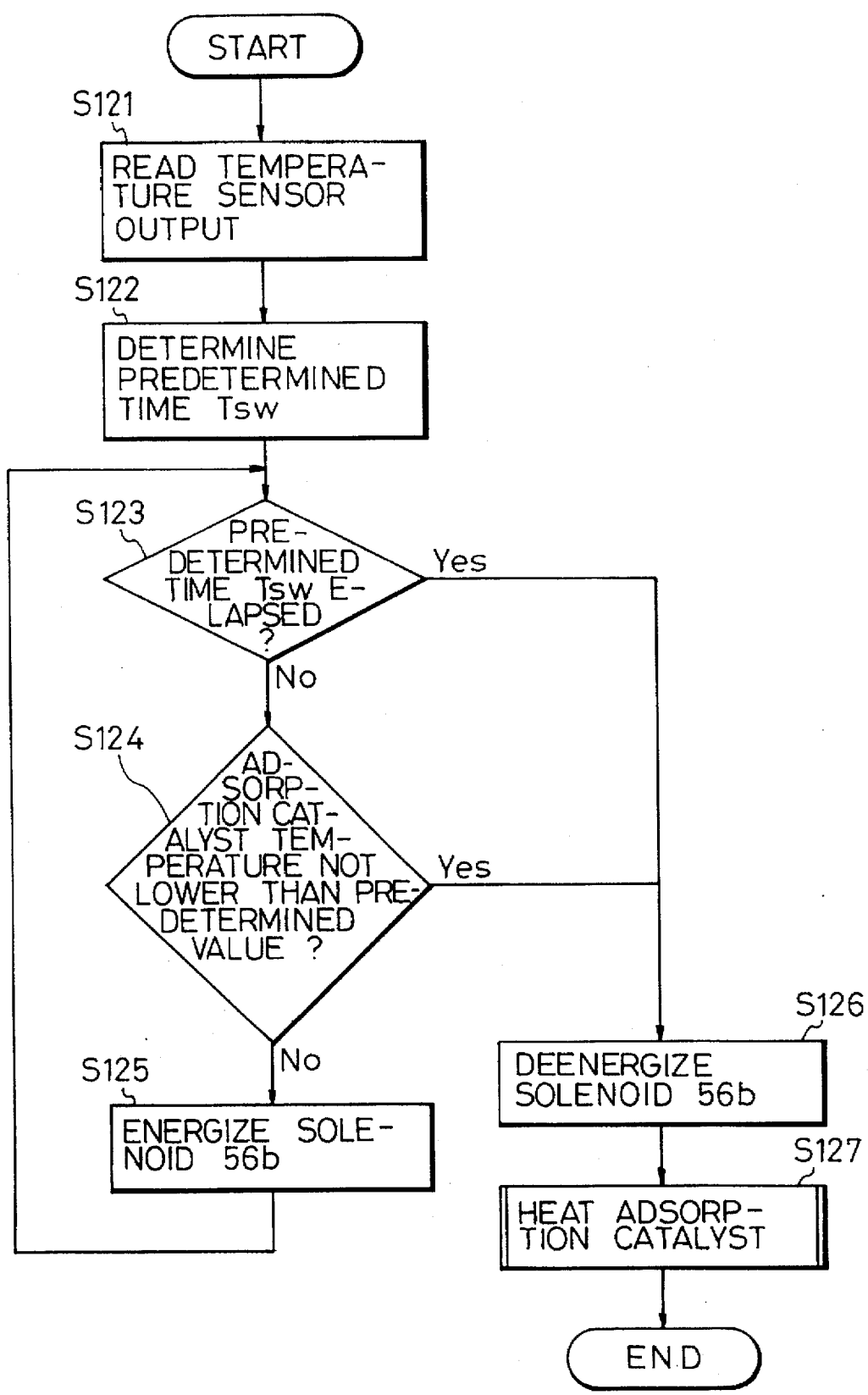
FIG. 36 is a flowchart showing an exhaust route selecting and adsorption catalyst heating routine for a modification of the eighth embodiment.

In the above modification in which the exhaust route is changed over depending on whether the predetermined time $T_{SW}$ in accordance with the engine cooling water temperature at the engine start has elapsed, in place of the water temperature sensor output reading step S121 and the predetermined time $T_{SW}$ determining step S122 in FIG. 36, a step may be provided to simply determine whether a predetermined time usually required for the completion of the warming up of the engine 10 or the completion of the activation of the three way catalyst 20, e.g., about 60 seconds has elapsed from the engine start.

Like the modification of the seventh modification, the heating means can be modified in various ways. The heating means may be disposed integrally with the adsorption catalyst. Also, the predetermined adsorption catalyst heating time may be variably set in accordance with the engine cooling water temperature detected at the engine start, or the heater 60 may be on/off controlled so that the adsorption catalyst temperature can be kept within a predetermined range. Further, the heating of the adsorption catalyst 40 may be started before the communication between the exhaust gas passages is interrupted.

The installation of the heating means is not indispensable. Therefore, the exhaust gas purifying apparatus can be modified in various ways. For example, the apparatus of the eighth embodiment can be modified as shown in FIGS. 18, 19, 20, 25, and 8, thereby simplifying the configuration of the apparatus. In the aforementioned modifications having no heating means, the exhaust route can be changed over in various ways. In the simplest way, only Steps S112, S113, and S114 in FIG. 35 may be executed. Specifically, the bypass exhaust gas passage 30 is communicated to the main exhaust gas passage 13 before the adsorption catalyst temperature reaches a predetermined value corresponding to the lower limit value of the adsorption catalyst deteriorating temperature range, e.g., about 600° C., and the communication between the bypass exhaust gas passage 30 and the main exhaust gas passage 13 is interrupted when the adsorption catalyst temperature reaches the predetermined value.

We claim:

1. An exhaust gas purifying apparatus comprising:

a main catalyst interposed in a main exhaust gas passage for purifying exhaust gas from an engine, the main exhaust gas passage being communicated with an exhaust side of an engine;

an adsorbent interposed in a bypass exhaust gas passage for adsorbing hydrocarbon contained in the exhaust gas, the bypass exhaust gas passage being communicated at least at its upstream end with the main exhaust gas passage, said adsorbent having a catalytic function of oxidizing adsorbed hydrocarbon in a predetermined temperature range;

heating means for heating said adsorbent;

exhaust route selecting means for selectively inhibiting communication between the bypass exhaust gas passage and the main exhaust gas passage at least at one end of the bypass exhaust gas passage; and control means for prohibiting an operation of said exhaust route selecting means at start of the engine, and for causing said exhaust route selecting means to operate when a predetermined condition is satisfied after the start of the engine;

whereby said adsorbent is heated by said heating means after said exhaust route selecting means is caused to operate.

2. The exhaust gas purifying apparatus according to claim 1, wherein said adsorbent is formed of crystalline silicate which carries copper.

3. The exhaust gas purifying apparatus according to claim 1, further comprising:

temperature detecting means for detecting a main catalyst temperature or an exhaust gas temperature near said main catalyst; and wherein said predetermined condition is satisfied when the main catalyst temperature or the exhaust gas temperature near said main catalyst exceeds a predetermined value.

4. The exhaust gas purifying apparatus according to claim 1, further comprising:

temperature detecting means for detecting an adsorbent temperature or an exhaust gas temperature near said adsorbent; and wherein said predetermined condition is satisfied when the adsorbent temperature or the exhaust gas temperature near said adsorbent exceeds a predetermined value.

5. The exhaust gas purifying apparatus according to claim 4, wherein the heating of said adsorbent performed by said heating means is stopped before said adsorbent temperature reaches a adsorbent deteriorating temperature range.

6. The exhaust gas purifying apparatus according to claim 1, further comprising:

temperature detecting means detects for detecting an engine cooling water temperature: and wherein said predetermined condition is satisfied when the engine cooling water temperature exceeds a predetermined value.

7. The exhaust gas purifying apparatus according to claim 1, wherein said predetermined condition is satisfied when a predetermined time period has elapsed.

8. The exhaust gas purifying apparatus according to claim 7, further comprising:

temperature detecting means detects for detecting an engine cooling water temperature; and wherein said predetermined time period is set in accordance with the engine cooling water temperature at the start of the engine.

9. The exhaust gas purifying apparatus according to claim 1, further comprising:

a preliminary catalyst for purifying exhaust gas, the preliminary catalyst being arranged in the main exhaust gas passage on an upstream side of a portion of which said main exhaust gas passage is communicated with said bypass exhaust gas passage.

10. The exhaust gas purifying apparatus according to claim 9, further comprising:

temperature detecting means for detecting a preliminary catalyst temperature or an exhaust gas temperature near said preliminary catalyst; and wherein said predetermined condition is satisfied when the preliminary catalyst temperature or the exhaust gas temperature near said preliminary catalyst exceeds a predetermined value.

11. The exhaust gas purifying apparatus according to claim 1, wherein said heating means is an electric heater.

12. The exhaust gas purifying apparatus according to claim 11, wherein said heating means utilizes exhaust heat.

13. The exhaust gas purifying apparatus according to claim 12, wherein said heating means is comprised of arranging said adsorbent at a position at which heat transfer is allowed from said main catalyst to said adsorbent.

14. The exhaust gas purifying apparatus according to claim 13, wherein said adsorbent is arranged so that at least one end thereof is exposed to the main exhaust gas passage.

* * * * *